US012123684B2

(12) United States Patent
Nerheim et al.

(10) Patent No.: US 12,123,684 B2
(45) Date of Patent: Oct. 22, 2024

(54) PROVIDING PULSES OF STIMULUS SIGNAL BETWEEN PAIRS OF ELECTRODES

(71) Applicant: Axon Enterprise, Inc., Scottsdale, AZ (US)

(72) Inventors: Magne H. Nerheim, Paradise Valley, AZ (US); Steven N. D. Brundula, Sedro-Woolley, WA (US); Stephen D. Handel, Seattle, WA (US)

(73) Assignee: Axon Enterprise, Inc., Scottsdale, AZ (US)

(*) Notice: Subject to any disclaimer, the term of this patent is extended or adjusted under 35 U.S.C. 154(b) by 0 days.

(21) Appl. No.: 18/144,113

(22) Filed: May 5, 2023

(65) Prior Publication Data

US 2023/0392906 A1 Dec. 7, 2023

Related U.S. Application Data

(63) Continuation of application No. 17/224,504, filed on Apr. 7, 2021, now Pat. No. 11,686,558, which is a continuation of application No. 16/397,459, filed on Apr. 29, 2019, now Pat. No. 10,989,502, which is a continuation of application No. 15/979,043, filed on (Continued)

(51) Int. Cl.
*F41H 13/00* (2006.01)
*H05C 1/04* (2006.01)

(52) U.S. Cl.
CPC .......... *F41H 13/0025* (2013.01); *H05C 1/04* (2013.01)

(58) Field of Classification Search
CPC .............................. F41H 13/0025; H05C 1/04
See application file for complete search history.

(56) References Cited

U.S. PATENT DOCUMENTS

| | | | |
|---|---|---|---|
| 2,057,138 | A | 10/1936 | Dowell |
| 3,683,280 | A | 8/1972 | Holt |

(Continued)

FOREIGN PATENT DOCUMENTS

| | | | |
|---|---|---|---|
| EP | 1762814 | A1 | 3/2007 |
| EP | 3265741 | A1 | 1/2018 |

(Continued)

OTHER PUBLICATIONS

European Patent Office, Extended European Search Report for European Application No. 23177639.4 mailed Nov. 29, 2023.

(Continued)

*Primary Examiner* — Scott Bauer
(74) *Attorney, Agent, or Firm* — Justin Powley

(57) ABSTRACT

A conducted electrical weapon ("CEW") launches wire-tethered electrodes from one or more cartridges to provide a current through a human or animal target to impede locomotion of the target. The CEW may detect when the electrodes launched from the cartridges may provide the current through more than one target. The CEW may detect when electrodes launched from the cartridges may provide the current through the same target. The CEW may set the pulse rate of the current based on detecting the launch of electrodes from one or more cartridges, detecting that electrodes may provide the current through two or more targets, and/or detecting that two or more pairs of electrodes may deliver the current through the same target.

20 Claims, 8 Drawing Sheets

Related U.S. Application Data

May 14, 2018, now Pat. No. 10,473,438, which is a continuation-in-part of application No. 15/090,872, filed on Apr. 5, 2016, now Pat. No. 10,015,871, which is a continuation-in-part of application No. 15/050,836, filed on Feb. 23, 2016, now Pat. No. 10,060,710.

(56) References Cited

U.S. PATENT DOCUMENTS

| | | | |
|---|---|---|---|
| 3,981,045 A | 9/1976 | Collins | |
| 4,253,132 A | 2/1981 | Cover | |
| 4,435,631 A | 3/1984 | Drouet | |
| 4,835,478 A | 5/1989 | Haddon | |
| 5,193,048 A | 3/1993 | Kaufman | |
| 6,220,098 B1 | 4/2001 | Johnson | |
| 6,636,412 B2 | 10/2003 | Smith | |
| 6,999,295 B2 | 2/2006 | Watkins | |
| 7,057,872 B2 | 6/2006 | Smith | |
| 7,096,792 B1 | 8/2006 | Carman | |
| 7,174,668 B2 | 2/2007 | Locklear | |
| 7,234,262 B2 | 6/2007 | Smith | |
| 7,280,340 B2 | 10/2007 | Smith | |
| 7,280,873 B2 | 10/2007 | Freed | |
| 7,314,007 B2 | 1/2008 | Su | |
| 7,474,518 B2 | 1/2009 | Rutz | |
| 7,520,081 B2 | 4/2009 | Kroll | |
| 7,602,597 B2 | 10/2009 | Smith | |
| 7,631,452 B1 | 12/2009 | Brundula | |
| 7,778,004 B2 | 8/2010 | Nerheim | |
| 7,800,885 B2 | 9/2010 | Brundula | |
| 7,886,648 B2 | 2/2011 | Williams | |
| 7,900,388 B2 | 3/2011 | Brundula | |
| 7,944,676 B2 | 5/2011 | Smith | |
| 7,952,850 B1 | 5/2011 | Finkel | |
| 8,098,474 B2 | 1/2012 | Smith | |
| 8,111,498 B2 | 2/2012 | Ben-Yaakov | |
| 8,166,690 B2 | 5/2012 | Brundula | |
| 8,254,080 B1 * | 8/2012 | Nerheim | H05C 1/06 361/232 |
| 8,356,438 B2 | 1/2013 | Brundula | |
| 8,879,232 B2 | 11/2014 | Ziriax | |
| 9,025,304 B2 | 5/2015 | Brundula | |
| 9,037,234 B2 | 5/2015 | Labbe | |
| 9,182,193 B1 | 11/2015 | Nerheim | |
| 9,233,241 B2 | 1/2016 | Long | |
| 10,015,871 B2 | 7/2018 | Handel | |
| 10,060,710 B2 | 8/2018 | Nerheim | |
| 2006/0067026 A1 | 3/2006 | Kaufman | |
| 2006/0256498 A1 | 11/2006 | Smith | |
| 2007/0019357 A1 | 1/2007 | Keely | |
| 2007/0070574 A1 * | 3/2007 | Nerheim | F41H 13/0025 361/232 |
| 2007/0081292 A1 | 4/2007 | Brundula | |
| 2007/0122770 A1 | 5/2007 | Swensen | |
| 2007/0130815 A1 | 6/2007 | Smith | |
| 2008/0130193 A1 | 6/2008 | Nerheim | |
| 2008/0158769 A1 | 7/2008 | Brundula | |
| 2009/0020002 A1 | 1/2009 | Williams | |
| 2009/0227191 A1 | 9/2009 | Tseng | |
| 2009/0319007 A1 | 12/2009 | Mcnulty | |
| 2011/0002077 A1 | 1/2011 | Brundula et al. | |
| 2011/0026183 A1 | 2/2011 | Wu | |
| 2011/0137369 A1 | 6/2011 | Ryu | |
| 2012/0078554 A1 | 3/2012 | Gagnon | |
| 2012/0170168 A1 | 7/2012 | Brundula | |
| 2012/0176722 A1 | 7/2012 | Brundula | |
| 2012/0262293 A1 | 10/2012 | Brave | |
| 2013/0083447 A2 | 4/2013 | D'Andrea | |
| 2013/0261685 A1 | 10/2013 | Shuros | |
| 2014/0081369 A1 | 3/2014 | Sosa | |
| 2014/0233146 A1 | 8/2014 | Gavin | |
| 2018/0259303 A1 | 9/2018 | Nerheim | |
| 2018/0259303 A1 | 9/2018 | Nerheim | |
| 2019/0281259 A1 | 9/2019 | Palazzolo | |

FOREIGN PATENT DOCUMENTS

| | | |
|---|---|---|
| IN | 201202554 P3 | 1/2014 |
| WO | 2017146749 A1 | 8/2017 |

OTHER PUBLICATIONS

USPTO, Notice of Allowance and Fee(s) Due in U.S. Appl. No. 15/050,749 mailed Jan. 31, 2018.

USPTO, Notice of Allowance and Fee(s) Due in U.S. Appl. No. 15/050,780 mailed Feb. 1, 2018.

USPTO, Corrected Notice of Allowability in U.S. Appl. No. 15/050,780 mailed Jun. 4, 2018.

USPTO, Corrected Notice of Allowability in U.S. Appl. No. 15/050,780 mailed Jun. 15, 2018.

USPTO, Notice of Allowance and Fee(s) Due in U.S. Appl. No. 15/050,836 mailed Feb. 28, 2018.

USPTO, Notice of Allowance and Fee(s) Due in U.S. Appl. No. 15/050,836 mailed Jul. 6, 2018.

USPTO, Notice of Allowance and Fee(s) Due in U.S. Appl. No. 15/090,872 mailed Apr. 6, 2018.

USPTO, Notice of Allowance and Fee(s) Due in U.S. Appl. No. 15/979,043 mailed Jul. 30, 2019.

USPTO, Corrected Notice of Allowability in U.S. Appl. No. 15/979,043 mailed Oct. 3, 2019.

USPTO, Notice of Allowance and Fee(s) Due in U.S. Appl. No. 16/397,459 mailed Dec. 30, 2020.

KIPO, International Search Authority, International Search Report and Written Opinion in International Application No. PCT/US2016/026056 mailed Nov. 21, 2016.

EPO, Extended European Search Report in EP Patent Application No. 16891857.1 dated Sep. 21, 2018.

EPO, Communication Under Rule 71(3) Intention to Grant in EP Patent Application No. 16891857.1 dated Dec. 18, 2019.

Taiwan Patent Office, Taiwan IPO Search Report and Office Action in Taiwan Invention Patent Application No. 105113308 dated Nov. 13, 2017.

Taiwan Patent Office, Allowance Decision in Taiwan Invention Patent Application No. 105113308 dated Apr. 23, 2018.

Australian Government, IP Australia, Examination Report in Application No. 2016390807 dated Apr. 16, 2018.

Australian Government, IP Australia, Notice of Acceptance in Application No. 2016390807 dated Aug. 23, 2018.

Australian Government, IP Australia, Examination Report in Application No. 2018264141 dated Dec. 11, 2019.

CIPO, Office Action in Canadian Patent Application No. 2,976,809 dated Jun. 18, 2018.

CIPO, Office Action in Canadian Patent Application No. 2,976,809 dated Jan. 23, 2019.

CIPO, Notice of Allowance in Canadian Patent Application No. 2,976809 dated Jan. 13, 2020.

CIPO, Office Action in Canadian Patent Application No. 2,976,809 dated Dec. 4, 2020.

European Patent Office, Communication pursuant to Article 94(3) EPC for European Application No. 20 170 929.2-1005, Jul. 14, 2021, p. 1-5.

Canadian Patent Office, Office Action for Canadian Patent Application No. 2,976,809 mailed Oct. 14, 2021.

Australian Patent Office, First Examination Report for Australian Patent Application No. 2020273331 mailed Oct. 15, 2021.

European Patent Office, Communication under Rule 71(3) EPC for European Application No. 20170929.2 mailed Apr. 19, 2022.

Canadian Intellectual Property Office, Office Action for Canadian Application No. 2,976,809 mailed Aug. 30, 2022.

European Patent Office, Communication under Rule 71(3) for European Application No. 20170929.2-1015 mailed Sep. 23, 2022.

Canadian Intellectual Property Office, Office Action for Canadian Application No. 2,976,809 mailed May 31, 2023.

USPTO, Corrected NOA for U.S. Appl. No. 17/224,504, mailed May 30, 2023.

Canadian Intellectual Property Office, Notice of Allowance for Canadian Application No. 2,976,809 mailed Mar. 18, 2024.

(56) References Cited

OTHER PUBLICATIONS

IP Australia, Examination Report No. 1 for Australian Application No. 2023200745 mailed Apr. 18, 2024.

* cited by examiner

PROVIDING PULSES OF STIMULUS SIGNAL BETWEEN PAIRS OF ELECTRODES

FIELD OF THE INVENTION

Embodiments of the present invention relate to a conducted electrical weapon ("CEW") (e.g., electronic control device) that launches electrodes to provide a current through a human or animal target to impede locomotion of the target.

BRIEF DESCRIPTION OF THE DRAWING

Embodiments of the present invention will be described with reference to the drawing, wherein like designations denote like elements, and.

DETAILED DESCRIPTION OF THE PREFERRED EMBODIMENTS

Figure 1:
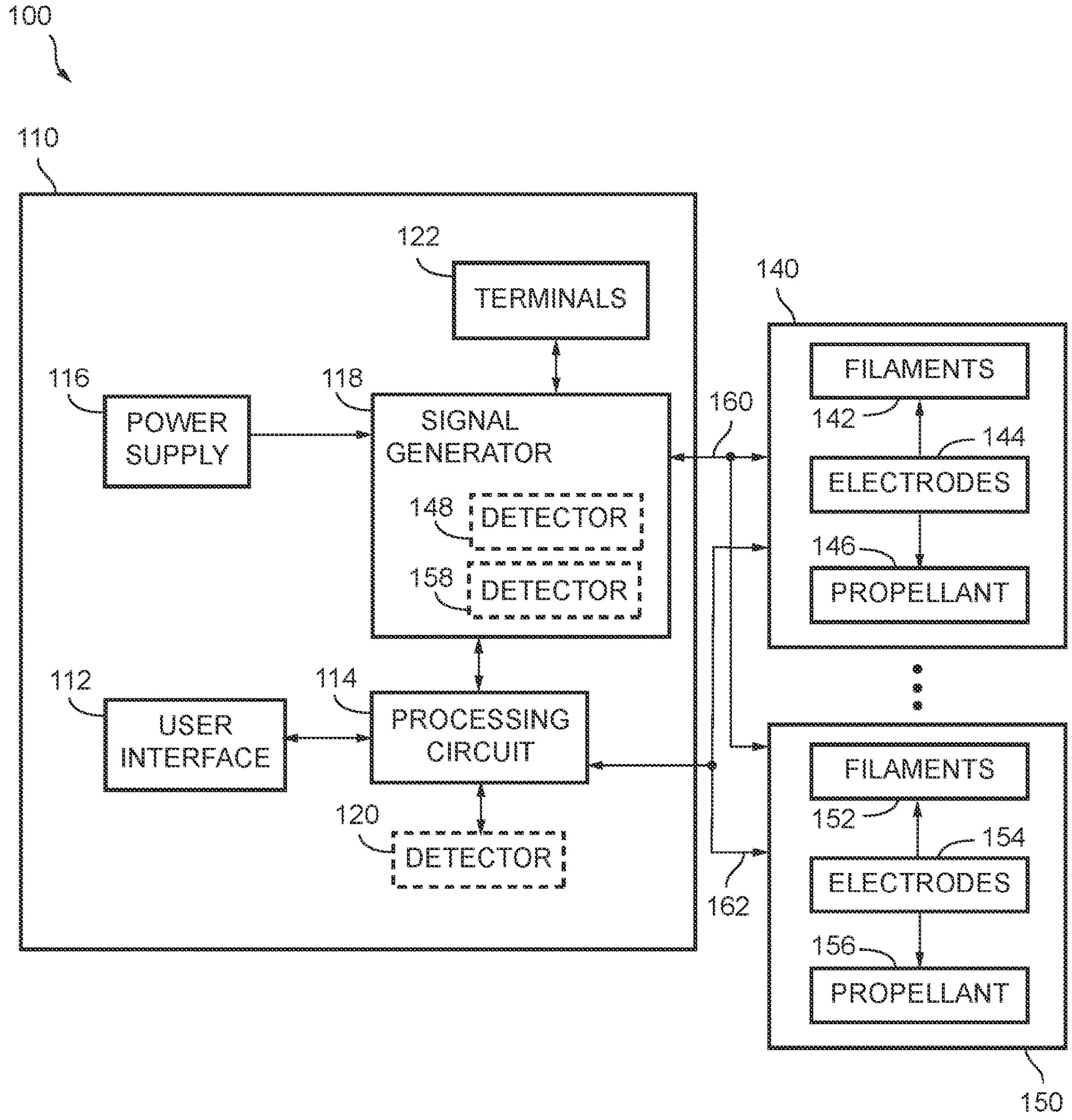
FIG. 1 is a functional diagram of a conducted electrical weapon ("CEW") according to various aspects of the present invention.

A CEW provides (e.g., delivers) a current through tissue of a human or animal target. The current may interfere with voluntary locomotion (e.g., walking, running, moving) of the target. The current may cause pain that encourages the target to stop moving. The current may cause skeletal muscles of the target to become stiff (e.g., lock up, freeze) so as to disrupt voluntary control of the muscles (e.g., neuromuscular incapacitation) by the target thereby interfering with voluntary locomotion by the target.

A current may be delivered through a target via terminals coupled to the CEW. Delivery of a current through a target includes delivery of the current through the tissue of the target. Delivery via terminals is referred to as local delivery because the CEW is brought proximate to the target to deliver the current. To provide local delivery of a current, the user of the CEW is generally within arm's reach of the target and brings the terminals of the CEW into contact with or proximate to target tissue to deliver the current through the target.

A current may be delivered through a target via one or more electrodes that are tethered by respective wires to the CEW. Delivery via wire-tethered electrodes is referred to as remote delivery because the CEW, and user of the CEW, may be separated from the target up to the length of the wire tether to deliver the current through the target. To provide remote delivery of a current, the user operates the CEW to launch one or more, usually two, electrodes toward the target. The electrodes fly (e.g., travel) from the CEW toward the target while the respective wire tethers extend behind the electrodes. The wire tether electrically couples the CEW to the electrode. The electrode may electrically couple to the target thereby coupling the CEW to the target. When one or more electrodes land on or proximate to target tissue, the current is provided through the target via the one or more electrodes and their respective wire tethers.

Conventional CEWs launch at least two electrodes to remotely deliver a current through a target. The at least two electrodes land on (e.g., impact, hit, strike) or proximate to target tissue to form a circuit through the first tether and electrode, target tissue, and the second tether and electrode.

Terminals or electrodes contact or are proximate to target tissue to deliver a current through the target. Contact of a terminal or electrode with target tissue establishes an electrical coupling with target tissue to deliver the current. A terminal or electrode that is proximate to target tissue may use ionization (e.g., electrical discharge) to establish an electrical coupling with target tissue. Ionization may also be referred to as arcing.

Ionization occurs when the electric potential (e.g., field strength, potential gradient) across a gap is sufficiently high to ionize (e.g., break down) the gas (e.g., air) molecules in the gap. The ionized molecules may establish a low impedance path (e.g., ionization path) across the gap that permits a current to flow across the gap. The air between terminals that are spaced apart on a face (e.g., front) of a CEW may be ionized to permit a current to flow between the terminals. The air between an electrode and target tissue may be ionized to permit a current to flow between the electrode and the target. As discussed above, ionization may be used to establish an electrical coupling, for example between two terminals and/or between an electrode and target tissue.

Ionization of air produces an audible sound as a result of the rapid expansion of the air. The sound produced by ionization of air in gaps is referred to herein as the sound of ionization.

In use, a terminal or electrode may be separated from target tissue by the target's clothing or a gap of air. A signal generator of the CEW may provide a signal (e.g., current, pulses of current) at a high voltage, in the range of 40,000 to 100,000 volts, to ionize the air in the clothing or the air in the gap that separates the terminal or electrode from target tissue. Ionizing the air establishes a low impedance ionization path from the terminal or electrode to target tissue that may be used to deliver a current into target tissue via the ionization path. After ionization, the ionization path will persist (e.g., remain in existence) as long as a current is provided via the ionization path. When the current provided by the ionization path ceases or is reduced below a threshold (e.g., amperage, voltage), the ionization path collapses (e.g., ceases to exist) and the terminal or electrode is no longer electrically coupled to target tissue because the impedance between the terminal or electrode and target tissue is high. A high voltage in the range of about 50,000 volts can ionize air in a gap of up to about one inch.

As discussed above, a high voltage may electrically couple an electrode to a target by ionizing air between the electrode and the target to form an ionization path that electrically couples the electrode to the target for the duration of the ionization path. A spark gap may also be used for electrically coupling responsive to ionization. An electrical circuit that includes a spark gap may be open (e.g., non-conductive, high impedance) until an ionization path has been formed across the air gap in the spark gap. In the present invention, referring to FIG. 5, a spark gap is in series with a secondary winding (e.g., coil) of a transformer and an electrode. The secondary winding electrically couples to the electrode responsive to a voltage that ionizes the air in the gap of the spark gap to form a low impedance ionization path as discussed above. The electrode remains coupled to the secondary winding as long as the ionization path is established (e.g., exists).

Terminals on the face of a weapon may also operate to provide a warning to a target. A warning may inhibit locomotion of a target by convincing the target to stop moving to avoid possible delivery of a current. A warning may convince a target to flee to avoid possible delivery of a current. Conventional CEWs include at least two terminals at the face of the CEW for delivering a current via local delivery and/or a warning. A CEW may include two terminals for each bay that accepts a deployment unit (e.g., cartridge). For example, a CEW with two bays that each accepts a single deployment unit for a total of two deployment units would have four terminals. The terminals are spaced apart from each other. One terminal may be positioned above a bay and the other terminal below the bay. A CEW may provide (e.g., impress) a high voltage across the terminals. In the event that the electrodes of the deployment unit in the bay have not been deployed (e.g., launched), the high voltage impressed across the terminals will result in ionization of the air between the terminals. The arc between the terminals is visible to the naked eye. Conventional CEW also provide a current as a series of pulses. A series of pulses includes two or more space apart pulses of current. Each pulse includes a high voltage portion for ionization of air in a gap so a warning across the terminals of a CEW is a series of arcs that occur close to each other in time. Each time a pulse of the current establishes an arc, an audible sound (e.g., noise) is produced. So, the warning provided by a CEW is both visible and audible. The arc between the terminals and any sound (e.g., noise) that results due to arcing operates to warn a target of the presence of a CEW and its user.

A CEW according to various aspects of the present invention includes a handle and one or more deployment units. A handle includes one or more bays for receiving deployment units. A deployment unit may be positioned in (e.g., inserted into, coupled to) a bay for deployment of electrodes from the deployment unit to perform a remote delivery. A deployment unit may releasably electrically and mechanically couple to a handle. A deployment unit includes one or more electrodes for launching toward a target to remotely deliver the current through the target. Typically, a deployment unit includes two electrodes that are launched at the same time. Launching the electrodes from a deployment unit may be referred to as activating (e.g., firing) a deployment unit. Generally, activating a deployment unit launches all of the electrodes of the deployment unit, so the deployment unit may be activated only once to launch electrodes. After use (e.g., activation, firing), a deployment unit may be removed from the bay and replaced with an unused (e.g., not fired, not activated) deployment unit to permit launch of additional electrodes.

The handle includes, inter alia, a signal generator for providing the current and a user interface for operation by a user to initiate delivery of a current, launch of the electrodes from a deployment unit, and/or provision of a warning. A handle may be shaped for ergonomic use by a user. Conventional CEWs are shaped like conventional fire arms such as a pistol. A handle may include a processing circuit for performing and/or controlling the functions of the handle. A deployment unit may include a processing circuit for performing and/or controlling the functions of a deployment unit. A handle may electronically communicate with a deployment unit. A processing circuit of a handle may perform some or all of the functions of a processing circuit in a deployment unit.

Although an embodiment of a CEW includes a pistol-like device, a CEW that includes the improvements of the present invention may be implemented as a night stick, a club, a rifle, a projectile, or in any other suitable form factor.

In a functional example of a CEW, according to various aspects of the present invention, CEW 100 includes handle 110 and one or more deployment units 140 and 150. Handle 110 includes, inter alia, user interface 112, processing circuit 114, power supply 116, signal generator 118, detector 120, and terminals 122.

Deployment unit 140 includes, inter alia, filaments (e.g., wires, tethers) 142, electrodes 144, and propellant 146. Deployment unit 150 includes, inter alia, filaments 152, electrodes 154, and propellant 156. In an implementation, electrodes 144 and 154 each include two electrodes respectively with each electrode mechanically and electrically coupled to one filament respectively of filaments 142 and filaments 152 respectively. For example, in an implementation referring to FIG. 2, the electrodes of deployment unit 240 include electrodes 244 and 248 while the electrodes of deployment unit 250 include electrodes 254 and 258.

A power supply provides power (e.g., energy). For a conventional CEW, a power supply provides electrical power. Providing electrical power may include providing a current at a voltage. Electrical power from a power supply may be provided as a direct current ("DC"). Electrical power from a power supply may be provided as an alternating current ("AC"). A power supply may include a battery. A power supply may provide energy for performing the functions of a CEW. A power supply may provide the energy for a current that is provided through a target to impede locomotion of the target. A power supply may provide energy for operating the electronic and/or electrical components (e.g., parts, subsystems, circuits) of a CEW and/or one or more deployment units.

The energy of a power supply may be renewable or exhaustible. A power supply may be replaceable. The energy from a power supply may be converted from one form (e.g., voltage, current, magnetic) to another form to perform the functions of a CEW.

For example, power supply 116 provides power for the operation of user interface 112, signal generator 118, processing circuit 114, and detector 120. Power supply 116 provides the energy for a current for delivery through a target. The current delivered through a target may be provided via filaments 142, electrodes 144, filaments 152, and electrodes 154.

A user interface may include one or more controls that permit a user to interact and/or communicate with a CEW. Via a user interface, a user may control (e.g., influence) the operation (e.g., function) of a CEW. A user interface may include any suitable device for operation by a user to control the operation of a CEW. A user interface may include controls. A control includes any electromechanical device suitable for manual manipulation (e.g., operation) by a user. A control includes any electromechanical device for operation by a user to establish or break an electrical circuit. A control may include a portion of a touch screen. A control may include a switch. A switch includes a pushbutton switch, a rocker switch, a key switch, a detect switch, a rotary switch, a slide switch, a snap action switch, a tactile switch, a thumbwheel switch, a push wheel switch, a toggle switch, and a key lock switch (e.g., switch lock). Operation of a control may occur by the selection of a portion of a touch screen.

Operation of a control may provide information to a device. Operation of a control of the user interface may result in performance of a function, halting performance of a function, resuming performance of a function, and/or suspending performance of a function of the CEW.

The term "control", in the singular, represents a single electromechanical device for operation by a user to provide information to a CEW. The term "controls", in plural, represents a plurality of electromechanically devices for operation by a user to provide information to a CEW. The term "controls" include at least a first control and a second control.

A processing circuit may detect the operation of a control. A processing circuit may perform a function of the CEW responsive to detecting operation of a control. A processing circuit may perform a function, halt a function, resume a function, and/or suspend a function of the CEW of which the control and the processing circuit are a part responsive to operation of one or more controls. A control may provide analog or binary information to a processing circuit. Operation of a control includes operating an electromechanical device or selecting a portion of touch screen.

The function performed by a CEW responsive to operation of a control may depend on the present (e.g., current) operating state (e.g., present state of operation, present function being performed) of the CEW of which the control is a part. For example, if a CEW is presently performing function 1, operating a specific control may result in the device performing function 2. If the device is presently performing function 2, operating the same control again may result in the device performing function 3 as opposed to function 1 again.

A user interface may provide information to a user. A user may receive visual and/or audible information from a user interface. A user may receive visual information via devices that visually display (e.g., present, show) information (e.g., LCDs, LEDs, light sources, graphical and/or textual display, display, monitor, touchscreen). A user interface may include a communication circuit for transmitting information to an electronic device (e.g., smart phone, tablet) for presentation to a user.

For example, CEW 200 includes controls 264 and 262. Control 264 is a switch that performs the function of a safety. When control 264 is enabled, CEW 200 cannot launch electrodes or provide a current via electrodes or terminals. When control 264 is disabled (e.g., off), CEW 200 may perform the functions of a CEW. Control 262 is a switch that performs the function of a trigger. When control 264 is disabled and control 262 is operated (e.g., pulled), CEW 200 begins the process of providing a current for disabling a target, launching electrodes to provide the current, and/or providing a warning. Controls 262 and 264 are a part of the user interface of CEW 200. CEW 200 may include other controls or a display as part of the user interface of CEW 200.

A processing circuit includes any circuitry and/or electrical or electronic component for performing a function. A processing circuit may include circuitry that performs (e.g., executes) a stored program. A processing circuit may include a digital signal processor, a microcontroller, a microprocessor, an application specific integrated circuit, a programmable logic device, logic circuitry, state machines, MEMS devices, signal conditioning circuitry, communication circuitry, a conventional computer, a conventional radio, a network appliance, data busses, address busses, and/or any combination thereof in any quantity suitable for performing a function and/or executing one or more stored programs.

A processing circuit may include conventional passive electronic devices (e.g., resistors, capacitors, inductors) and/or active electronic devices (op amps, comparators, analog-to-digital converters, digital-to-analog converters, programmable logic, SRCs, transistors). A processing circuit may include conventional data buses, output ports, input ports, timers, memory, and arithmetic units.

A processing circuit may provide and/or receive electrical signals whether digital and/or analog in form. A processing circuit may provide and/or receive digital information via a conventional bus using any conventional protocol. A processing circuit may receive information, manipulate the received information, and provide the manipulated information. A processing circuit may store information and retrieve stored information. Information received, stored, and/or manipulated by the processing circuit may be used to perform a function, control a function, and/or to perform a stored program.

A processing circuit may have a low power state in which only a portion of its circuits operate or the processing circuit performs only certain function. A processing circuit may be switched (e.g., awoken) from a low power state to a higher power state in which more or all of its circuits operate or the processing circuit performs additional functions or all of its functions.

A processing circuit may control the operation and/or function of other circuits and/or components of a system such as a CEW. A processing circuit may receive status information regarding the operation of other components, perform calculations with respect to the status information, and provide commands (e.g., instructions) to one or more other components for the component to start operation, continue operation, alter operation, suspend operation, or cease operation. Commands and/or status may be communicated between a processing circuit and other circuits and/or components via any type of bus including any type of conventional data/address bus.

A signal generator provides a signal (e.g., stimulus signal). A signal may include a current. A signal may include a pulse of current. A signal may include a series (e.g., number) of current pulses. The signal provide by a signal generator may electrically couple a CEW to a target. A signal generator may provide a signal at a voltage of sufficient magnitude to ionize air in one or more gaps in series with the signal generator and the target to establish one or more ionization paths to sustain delivery of a current through the target as discussed above. The signal provided by a signal generator may provide a current through target tissue to interfere with (e.g., impede) locomotion of the target. A signal generator may provide a signal at a voltage to impede locomotion of a target by inducing fear, pain, and/or an inability to voluntary control skeletal muscles as discussed above. A signal that accomplishes electrical coupling and/or interference with locomotion of a target may be referred to as a stimulus signal.

A stimulus signal, as discussed above, may include one or more pulses of current. A pulse of current may be provided at one or more magnitudes of voltage. A pulse of current may accomplish electrical coupling and impeding locomotion as discussed above. A current pulse of a conventional stimulus signal includes a high voltage portion for ionizing gaps of air to establish electrical coupling and a lower voltage portion for providing current through target tissue to impede locomotion of the target. A portion of the current used to ionize gaps of air to establish electrical connectivity may also contribute to the current provide through target tissue to impede locomotion of the target.

A stimulus signal may include a series of current pulses. Pulses may be delivered at a pulse rate (e.g., 22 pps) for a period of time (e.g., 5 second). One or more stimulus signals, or in other words one or more series of pulses, may be applied to a target to impede locomotion by the target. Each pulse may be capable of establishing electrical connectivity (e.g., ionizing air in one or more gaps) and interfering with locomotion of the target by passing through a circuit that includes target tissue.

A signal generator includes circuits for receiving electrical energy and for providing the stimulus signal. Electrical/electronic circuits (e.g., components) of a signal generator may include capacitors, resistors, inductors, spark gaps, transformers, silicon controlled rectifiers ("SCRs"), and analog-to-digital converters. A processing circuit may cooperate with and/or control the circuits of a signal generator to produce a stimulus signal.

A signal generator may receive electrical energy from a power supply. A signal generator may convert the energy from one form of energy into a stimulus signal for ionizing gaps of air and interfering with locomotion of a target. A processing circuit may cooperate with and/or control a power supply in its provision of energy to a signal generator. A processing circuit may cooperate with and/or control a signal generator in converting the received electrical energy into a stimulus signal.

A detector detects (e.g., measures, witnesses, discovers, determines) a physical property (e.g., intensive, extensive, isotropic, anisotropic). A physical property may include momentum, capacitance, electric charge, electric impedance, electric potential, frequency, magnetic field, magnetic flux, mass, pressure, spin, stiffness, temperature, tension, velocity, sound, and heat. A detector may detect a quantity, a magnitude, and/or a change in a physical property. A detector may detect a physical property and/or a change in a physical property directly and/or indirectly. A detector may detect a physical property and/or a change in a physical property of an object. A detector may detect a physical quantity (e.g., extensive, intensive). A detector may detect a change in a physical quantity directly and/or indirectly. A physical quantity may include an amount of time, an elapse (e.g., lapse, expiration) of time, an electric current, an amount of electrical charge, a current density, an amount (e.g., magnitude) of capacitance, an amount of resistance, and a flux density. A detector may detect one or more physical properties and/or physical quantities at the same time or at least partially at the same time.

A detector may transform a detected physical property from one physical property to another physical property (e.g., electrical to kinetic). A detector may transform (e.g., mathematical transformation) a detected physical quantity. A detector may relate a detected physical property and/or physical quantity to another physical property and/or physical quantity. A detector may detect one physical property and/or physical quantity and deduce the existence of another physical property and/or physical quantity.

A detector may cooperate with a processing circuit such as processing circuit 114 or may include a processing circuit for detecting, transforming, relating, and deducing physical properties and/or physical quantities. A processing circuit may include any conventional circuit for detecting, transforming, relating, and deducing physical properties and/or physical quantities. For example, a processing circuit may include a voltage sensor, a current sensor, a charge sensor, and/or an electromagnetic signal sensor. A processing circuit may include a processor and/or a signal processor for calculating, relating, and/or deducing. A processing circuit may include a memory for storing and/or retrieving information (e.g., data).

A detector may provide information (e.g., report). A detector may provide information regarding a physical property and/or a change in a physical property. A detector may provide information regarding a physical quantity and/or a change in a physical quantity. A detector may provide information determined using a processing circuit.

A detector may detect physical properties for determining whether a current was delivered to a target.

A filament conducts a current. A filament electrically couples a signal generator to an electrode. A filament carries a current at a voltage for ionizing air in one or more gaps and impeding locomotion. A filament mechanically couples to an electrode. A filament mechanically couples to a deployment unit. A filament deploys from a deployment unit upon launch of an electrode to extend (e.g., stretch, deploy) between a deployment unit in a handle and a target. A filament is positioned in a deployment unit prior to deployment of the electrode that is mechanically coupled to the filament.

An electrode, as discussed above, couples to a filament and is launched toward a target to deliver a current through the target. An electrode may include aerodynamic structures to improve accuracy of flight from a CEW toward the target. An electrode may include structures (e.g., spear, barbs) for mechanically coupling to a target. Movement of an electrode out of a deployment unit toward a target deploys (e.g., pulls) the filament from the deployment unit.

A propellant propels one or more electrodes from a deployment unit toward a target. A propellant applies a force (e.g., from expanding gas) on a surface of the one or more electrodes to push the one or more electrodes from the deployment unit toward the target. The force applied to the one or more electrodes is sufficient to accelerate the electrodes to a velocity suitable for traversing a distance to a target, for deploying the respective filaments coupled to the one or more electrodes, and for coupling, if possible, the electrodes to the target.

A deployment unit may include a coupler (e.g., connector) that electrically couples (e.g., connects) the deployment unit to a handle and to the signal generator. One end of the filament may be coupled to the connector inside the deployment unit. The current provided by the signal generator is provided to the deployment unit via the coupler then to the target via the filament and the electrode. The same or different coupler may be used for a processing unit to communicate with a deployment unit. Upon removing a deployment unit from the bay of the handle, the coupler of the deployment unit separates from the handle to permit removal of the deployment unit from the bay of the handle. Insertion of a new deployment unit into the bay electrically couples the coupler of the new deployment unit to the handle.

A terminal, as discussed above, may provide a current. A terminal may provide a current through target tissue during a local delivery. Two or more terminals may electrically couple to a target to form a circuit through target tissue to provide a current. A terminal may include a contact portion for contacting target tissue and/or establishing an electrical coupling with a target. A signal generator may apply a voltage across two or more terminals. A voltage applied across terminals may be of sufficiently high magnitude to ionize the air between the terminals as discussed above. Ionizing air between terminals causes an arc to appear across the terminals. Air may be ionized between the contact portions of the two or more terminals.

As discussed above, two or more terminals may be mechanically coupled to a handle. Two or more terminals may be coupled to a handle near the bays that receive the deployment units. In an implementation, one terminal is positioned at the top of each bay and another terminal is positioned at the bottom of each bay so that two terminals are associated with each bay. In an implementation, terminal 214 is positioned above bay 232 and deployment unit 250 and terminal 216 is positioned below bay 232 and deployment unit 250. Terminal 224 is positioned above bay 230 and deployment unit 240 and terminal 226 is positioned below bay 230 and deployment unit 240.

In an implementation, handle 110 and deployment units 140 and 150 perform the functions of a handle and deployment units discussed above. User interface 112, processing circuit 114, power supply 116, signal generator 118, detector 120, and terminals 122 perform the functions of a user interface, a processing circuit, a power supply, a signal generator, a detector and terminals respectively as discussed above. Deployment unit 140, which includes filaments 142, electrodes 144, and propellant 146, performs the functions of a deployment unit, filaments, electrodes, and a propellant respectively as discussed above. Deployment unit 150, which includes filaments 152, electrodes 154, and propellant 156, perform the functions of a deployment unit, filaments, electrodes, and a propellant respectively as discussed above.

Power supply 116 provides energy to signal generator to provide a current through target tissue to impede locomotion of the target. Power supply 116 provides energy to user interface 112, processing circuit 114, signal generator 118, and detector 120 for the operation of these components. Power supply 116 may also provide power to electronic/electrical components of deployment unit 140 and 150 for the operation of those components. FIG. 1 shows a power bus between power supply 116 and signal generator 118 to represent the circuit for delivery of energy for the stimulus signal. The power busses to provide energy for the operation of electronic/electrical components of handle 110 are not shown. The power busses to provide energy to the components of deployment units 140 and/or 150 are not shown.

Power supply 116 may be any conventional device. Power supply 116 may include a battery.

User interface 112 includes physical structures and/or electronic devices so that a user may provide information and/or commands to CEW 100 and/or CEW 100 may provide information to the user. Physical structures and/or electronic devices for a user to provide information to CEW 100 include one or more controls as discussed above. Examples of such controls include safety 264 and trigger 262. A CEW may provide information to a user via a display (e.g., LCD, touch screen) that presents information, via audible sounds (e.g., a speaker, buzzer), and/or a haptic (e.g., vibration) device.

User interface 112 may include a communication circuit (e.g., transceiver) for local wireless communication (e.g., BLUETOOTH®, BLUETOOTH® Low Energy (BLE), ZIGBEE®) with an electronic device (e.g., smart phone, tablet). The electronic device may receive and present on its display information from CEW 100 for the user to read and/or hear. A user may use the touch screen of the electronic device to provide information to CEW 100 thereby moving some functions of user interface 112 to the electronic device via the communication link.

User interface 112 may provide a notice (e.g., electric signal, data packet) to processing circuit 114 responsive to operation of a control of user interface 112 and/or upon receipt of information from the user. User interface 112 may receive information from processing circuit 114 for presentation to a user.

Processing circuit 114 controls and/or coordinates the operation of handle 110. Processing circuit 114 may control and/or coordinate the operation of some or all aspects of operation of deployment unit 140 and 150. In an implementation, processing circuit 114 includes a microprocessor that executes a stored program. Processing circuit 114 includes memory, which is not separately shown because it may be integrated into the microprocessor that stores the executable program. The microprocessor includes input ports and output ports and/or data busses for communication with user interface 112, signal generator 118, detector 120, and deployment units 140 and 150 to receive notices and/or information and to provide information and/or control signals.

Processing circuit 114 receives notices and information from user interface 112. Processing circuit 114 performs the functions of CEW 100 responsive to notices and/or information from user interface 112. Processing circuit may control the operation, in whole or part, of user interface 112, signal generator 118, detector 120, and/or deployment units 140 and 150 to perform an operation of CEW 100.

For example, a user may operate trigger 262, while safety 264 is off, to indicate the user's desire to deliver a stimulus signal to a target. Processing circuit 114 may receive the notice from user interface 112 regarding the operation of trigger 262. Responsive to the notice, processing circuit 114 may instruct and/or control signal generator 118 to provide a stimulus signal. Processing circuit 114 may further instruct detector 120 to detect whether the stimulus signal is delivered to a target. Processing circuit 114 may further instruct detector 148 and/or detector 158 to detect whether the stimulus signal is delivered to the target.

Processing circuit 114 may further receive information from the other components (e.g., devices) of handle 110 and deployment units 140 and 150 regarding performance of an operation. For example, processing circuit 114 may receive information from detector 120, detector 148, and/or detector 158 regarding what was detected. Processing circuit 114 may receive information from signal generator 118 regarding the stimulus signal, such as information regarding voltage, charge, current, communication with deployment units 140 and 150, and/or communication with terminals 122. Processing circuit 114 may use received information to control delivery of future stimulus signals. Processing circuit 114 may receive information from deployment unit 140 and/or 150 regarding deployment. Processing circuit 114 may use any or all received information to control a future operation of CEW 100.

Processing circuit 114, handle 110, deployment unit 140, and/or deployment unit 150 may communicate information and/or control signals in any conventional manner using any conventional structures such as traces (e.g., conductors, wires, PCB traces) for signals, serial communication links, and/or parallel busses for address and/or data. Because deployment units 140 and 150 may be decoupled from handle 110, handle 110 and deployment units 140 and 150 may include couplers (e.g., connectors) that connect the traces, links, and/or busses (e.g., 160, 162) of handle 110 to the traces, links, and/or busses (e.g., 160, 162) of deployment unit 140 and/or 150 in such a manner that an electrical connection is established upon insertion of deployment unit 140 and/or 150 into a bay of handle 110 and disconnected upon removal of deployment unit 140 and/or 150 from the respective bay of handle 110. A coupler may include a conventional male-female coupler where the male portion is positioned in a bay of handle 110 and the female portion is positioned on a deployment unit or vice versa.

For example, deployment unit 240 and deployment unit 250 are inserted into bay 230 and 232 respectively in handle 210. Inserting deployment unit 240 into bay 230 couples deployment unit 240 to handle 210 so that filament 242, electrode 244, filament 246, and electrode 248 may be electrically coupled to handle 210 and to the signal generator of handle 210 (not shown). Inserting deployment unit 250 into bay 232 couples deployment unit 250 to handle 210 so that filament 252, electrode 254, filament 256, and electrode 258 may be electrically coupled to handle 210 and to the signal generator of handle 210. The coupler that couples deployment units 240 and 250 to handle 210 are not shown in FIG. 2, but are inside bays 230 and 232.

Figure 2:
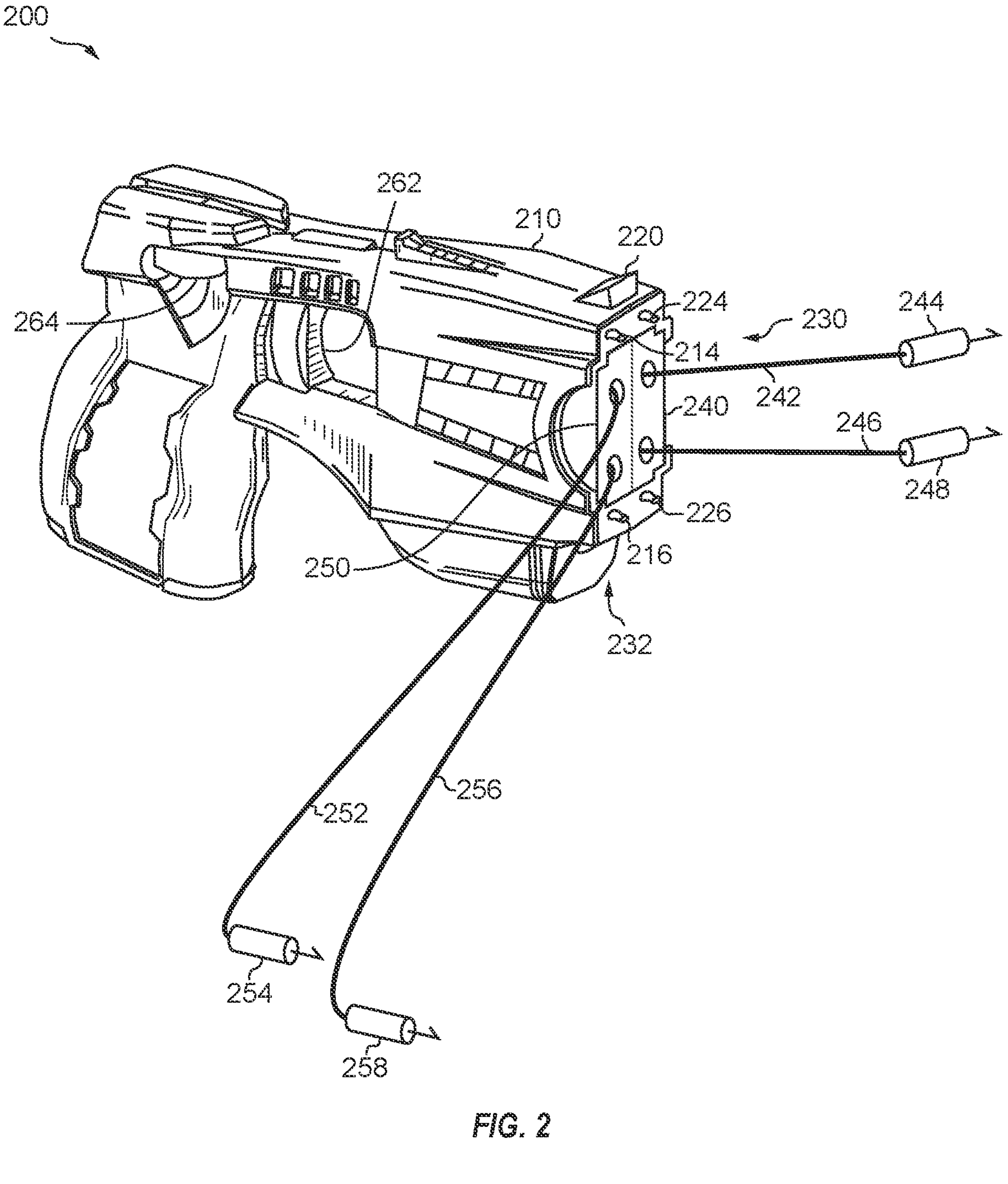
FIG. 2 is a plan view of a CEW with two tethered electrodes deployed from each of two deployment units.

The direction of travel of electrodes 254 and 258 in FIG. 2 is not in line with forward deployment from deployment unit 250 as would occur in normal operation. The positions of electrodes 254 and 258 relative to handle 210 and deployment unit 250 were chosen to provide clarity for discussion.

A coupler between handle 110 and deployment unit 140 and 150 respectively may also be used to removeably establish a path for providing a stimulus signal from signal generator 118 to a target via the filaments and electrodes of deployment units 140 and/or 150.

Signal generator 118 receives energy from power supply 116, control signals from processing circuit 114 and provides the stimulus signal to either terminals 122, electrodes 144 via filaments 142, and/or electrodes 154 via filaments 152. Signal generator 118 receives control signals from processing circuit 114 to determine characteristics of the stimulus signal. For example, a stimulus signal may be provided as a series of current pulses. Processing circuit 114 may control the operation of signal generator 118 to deliver a stimulus signal that has a certain number of current pulses, current pulses at a pre-determined number of pulses per second, current pulses that provide a pre-determined amount of current per pulse, or a predetermine duration of time (e.g., 5 seconds) for delivering current pulses.

Processing circuit 114 may further control signal generator 118 so that the stimulus pulse is provided by some electrodes of deployment units 140 and 150, but not other electrodes. Processing circuit 114 may control signal generator 118 so that some electrodes of deployment units 140 and/or 150 electrically couple with a target while the other electrodes of deployment units 140 and/or 150 do not electrically couple with the target. Processing circuit may instruct signal generator 118 to alternate electrical coupling and provision of the stimulus signal between deployed pairs of electrodes of deployment units 140 and 150.

A pair of electrodes means two electrodes. A combination of two electrodes means a pair of electrodes selected from two or more electrodes. Two electrodes may be selected from a collection (e.g., group) of two or more electrodes. For example, if a collection of electrodes includes three electrodes having electrode no. 1, electrode no. 2, and electrode no. 3, groups of two electrodes (e.g., pairs) include the group of electrode nos. 1 and 2, the group of electrode nos. 1 and 3, and the group of electrode nos. 2 and 3. In the present invention, electrodes provide a current at a voltage having a positive polarity or a negative polarity. Current is provided through a target via two electrodes where one electrode provides a current at a voltage having a positive polarity and the other electrode provides a current at a voltage having a negative polarity. For example, if electrode no. 1 delivers a current at a voltage having a positive polarity and electrode nos. 2 and 3 provide a current at a voltage having a negative polarity, then groups of two electrodes for delivering a current through a target include the group of electrode nos. 1 and 2 and the group of electrode nos. 1 and 3. Because electrode nos. 2 and 3 provide a current at a voltage that has the same polarity, electrode nos. 2 and 3 cannot provide a current through a target and are not considered as a pair of (e.g., group of two) electrodes when taking into account polarity. So, when polarity is taken into account, there may be fewer groups of two electrodes for delivering a current than when polarity is not taken into account.

For example, electrodes 244, 248, 254, and 258 have been deployed from deployment units 240 and 250. Depending on the polarity of the voltage that may be applied by the signal generator 118 on each launched electrode, the processing circuit of CEW 200 may instruct the signal generator of CEW 200 to permit two launched electrodes to attempt to electrically couple to a target. If the selected electrodes successfully electrically couple to the target, the signal generator may deliver a current through target tissue via the selected electrodes.

In an implementation, the signal generator of CEW 200 has designated electrode 244 and electrode 254 as electrodes that operate at a positive voltage polarity with respect to ground, and electrode 248 and electrode 258 as electrodes that operate at a negative voltage polarity with respect to ground. The processing circuit of CEW 200 may select two electrodes, one positive polarity electrode (e.g., 244, 254) and one negative polarity electrode (e.g., 248, 258) for attempting to electrically couple to a target to deliver a stimulus signal through the target. In this implementation, the processing circuit may instruct the signal generator to attempt to electrically couple two electrodes, one positive polarity and one negative polarity from the possible positive-negative polarity pairs: electrodes 244 and 248, electrodes 254 and 258, electrodes 244 and 258, and electrodes 248 and 254. Each pair of possible electrodes includes one electrode that operates at a positive polarity and one electrode that operates at a negative polarity.

If more than one pair of electrode is capable of electrically coupling to the target, for example, electrodes 244 and 248 or electrodes 244 and 258, the processing circuit of CEW 200 may provide a stimulus signal through the target via multiple pairs of electrodes. If multiple electrode pairs are available to electrically couple to the target and deliver the current through the target, the processing circuit may instruct (e.g., control) the signal generator to increase its rate of producing pulses so that sequentially selected electrode pairs provide the stimulus signal at a higher pulse rate than if only one pair of electrodes can electrically couple and provide the stimulus signal.

For example, suppose that the desired pulse rate delivered by an electrode pair is 15 to 30 pps, preferably 22 pulses per second ("pps") delivered for a 5 second period. If only electrodes 244 and 248 from deployment unit 240 have been deployed and the electrodes can electrically couple to the target, the signal generator may produce pulses at a rate of 15 to 30 pps, preferably 22 pps because the stimulus signal can be delivered via on one pair of electrodes. Since each cartridge includes only two electrodes, launching the electrodes from one cartridge means that a current may be provided via only one pair of electrodes, so detecting that the electrodes have been launched from only one cartridge may be used to set the pulse rate to 15 to 30 pps, preferably 22 pps.

However, suppose that electrodes 254 and 258 have also been deployed and can also electrically couple to the target. Because the current may be delivered by more than one pair of electrodes, the signal generator may generate pulses at between 30 and 100 pps, preferably 44 pps then alternately provide pulses through electrode pair 244 and 248, electrode pair 254 and 258, electrode pair 244 and 258, and electrode pair 248 and 254 so that each pair provides current pulses at a rate of 11 pps. In another implementation, signal generator may generate pulses at 88 pps so that each pair may provide pulses at a rate of 22 pps. Since each cartridge includes only two electrodes, launching the electrodes from two cartridges means that a current may be provided via more than one pair of electrodes, so detecting that the electrodes have been launched from two cartridges may be used to set the pulse rate to between 30 and 100 pps, preferably 44 pps.

Signal generator 118 may provide the stimulus signal via the deployed electrodes of deployment units 140 and 150 or terminals 122 as discussed above with respect to CEW 200. Terminals 122 are positioned on handle 110 and are spaced part. Each handle includes at least two terminals, such as terminals 224 and 226; however, a handle may include two terminals per bay, such as terminals 214, 216, 224, and 226. As discussed above, for each bay one terminal may be positioned above a bay and another terminal below the bay. Signal generator 118 may provide a stimulus signal to both terminals and to the selected deployed electrodes at the same time. The relative impedance between the electrodes and the selected deployed electrodes determines whether the stimulus signal will be delivered via the terminals or the electrodes.

For example, when deployment units 240 and 250 are not positioned in bays 230 and 232 respectively, the only path for a stimulus signal to travel is between terminals 214 and 216 and/or terminals 224 and 226. The voltage of the stimulus signal is sufficient to ionize air in the gap between the terminals, so the air between the terminals is ionized with each pulse of the current to produce a highly visible warning arc. When deployment units 240 and 250 are positioned in bays 230 and 232 respectively, but are not deployed, the only path for the stimulus signal is between terminals 214 and 216 and/or terminals 224 and 226, so a warning arc is produced across the front face of handle 210. When the electrodes of a deployment unit have been deployed, the stimulus signal when applied across the terminals and the deployed electrodes will travel the path of least resistance.

Generally, the impedance of a circuit that includes electrodes positioned in or near target flesh is less than the impedance of the circuit between the terminals on the face of the CEW, so the stimulus signal will likely travel the circuit via deployed electrodes rather than the circuit between terminals. However, if the impedance of the circuit between deployed electrodes is greater than the impedance of the circuit between the terminals, the stimulus signal will arc across the terminals even though electrodes are deployed. The impedance of the circuit between deployed electrodes may be higher than the impedance of the circuit between the terminals if the electrodes are far from target tissue (e.g., a miss) or all but one of the electrodes that could form a circuit are positioned far from target tissue (e.g., a miss).

Detecting an arc across the terminals indicates with a high likelihood (e.g., probability) that the current was not delivered via the wire-tethered electrodes through the target. Detecting that an arc did not occur across the terminals does not indicate with a high probability that the current was delivered through the target via the wire-tethered electrodes, but that the current may have been delivered through the target via the electrodes. When no arc is detected between the terminals of a CEW, other information related to the operation of the CEW may be used to determine the likelihood of delivery of the current through the target. Information for detecting a quality of a connection of the electrodes to a target and delivery of a current through the target is disclosed in U.S. patent application Ser. No. 12/891,666 filed Sep. 27, 2010 and herein incorporated by reference.

For example, suppose that electrodes 244 and 248 are positioned in or near target tissue at locations 412 and 414 respectively on target 400. Because electrodes 244 and 248 are in or near target tissue, the impedance in the circuit that includes electrodes 244 and 248 is likely less than the impedance of the circuit that includes terminals 224 and 226, so stimulus signal from the signal generator of CEW 200 will most likely travel the circuit through 244 and 248, and not across terminals 224 and 226, thereby delivering the stimulus signal through target 400. However, if electrode 254 is positioned in or near target tissue at location 432, but electrode 258 sticks into the rubber sole of the shoe of target 400 at position 434 or misses target 400 altogether, the impedance between 254 and 258 is most likely significantly higher than the impedance between terminals 214 and 216, so the stimulus signal will travel the circuit that includes terminals 214 and 216 thereby producing an arc across the front of handle 210 rather than a stimulus signal through target 400.

Detector 120, detector 148, and/or detector 158 detect information regarding a stimulus signal. Information detected by detectors 120, 148, and/or 158 may be used to deduce whether the stimulus signal was delivered through a target. Detector 120, detector 148, and/or detector 158 are shown in FIG. 1 in dashed lines because detector 120, detector 148, and/or detector 158 may be included or excluded from CEW 100. Detector 120 may be implemented as detector 220 position at a front (e.g., forward) portion of handle 210. Detector 148 may be implemented as detectors 590 and 594 for detecting current flow via either or both electrodes of a deployment unit (e.g., 140, 240, 560). Detector 158 may be implemented as detectors 592 and 596 for detecting current flow via either or both electrodes of a deployment unit (e.g., 150, 250, 570).

Detector 120 is not part of an electrical circuit that delivers the stimulus signal to a target, so detector 120 does not detect a flow of a current to determine whether the current was delivered through a target. Detector 120 detects physical properties. Physical properties may include the presence or absence of light and/or a characteristic of a sound wave. Detector 120 may include a microphone. Detector 120 may include a photo detector.

As discussed above, a stimulus signal from signal generator 118 travels the path of least resistance. When electrodes are positioned in or near target tissue, the path through the target via the filaments and electrodes is usually the path of least resistance. When the current travels the path of the filaments and the electrodes through the target, the current does not arc between the terminals at the front of handle 210. A processing circuit (e.g., processing circuit 114) may activate detector 220 to detect the presence of an arc (e.g., light, flash) across (e.g., between) terminals 214, 216, 224, and/or 226 after an operation of trigger 262. If detector 220 detects an arc (e.g., ionization) between terminals 214, 216, 224, and/or 226, processing circuit 114 may deduce (e.g., infer) that the stimulus signal was not delivered through the target via the filaments and electrodes because it arced across the front (e.g., face) of CEW 200. If detector 220 does not detect an arc (e.g., no light, no flash) and electrodes have been deployed, processing circuit 114 may deduce that the stimulus signal was likely provided through the target.

In another implementation, detector 220 detects sound (e.g., audio characteristic, presence/absence of sound wave, magnitude of a sound). Detector 220 may include a microphone. Detector 220 in combination with a processing circuit of CEW 200 may determine a distance between detector 220 and the location of occurrence of a sound. Location may include a position in front of the CEW (e.g., one-dimensional), a position in front of the CEW and to the right or the left (e.g., two-dimensional, 23 degrees to right, straight ahead, 15 degrees left), and/or a position in front of the CEW to the right or the left and up or down (three-dimensional). In an implementation, one detector 220 detects a one-dimensional position. In another implementation, two detectors 220 detect a two-dimensional position. In another implementation, three detectors detect a three-dimensional position.

Detectors may be positioned relative to the CEW and/or to each other to enhance detecting the position of occurrence of ionization. For example, two detectors may be positioned at an angle to each other so that the center of the area of detection lies in different planes. Three detectors may be positioned in a triangular arrangement relative to each other. Preferably, detectors should be positioned as far away from each other as possible within the limits of detecting physical occurrences in front of the CEW and still being positioned on the CEW.

Preferably, detectors are positioned away (e.g., rearward, back) from the face of the weapon so that current does not arc from the CEW or the terminals of the CEW into the detector. In one implementation, the one or more detectors 220 are positioned at least two inches away from the face of the CEW.

Detector 220 and the processing circuit may also cooperate to determine a type of sound. Sounds may be classified by type so as to distinguish the characteristic sound of a stimulus signal ionizing air in a gap from other sounds such as ambient sounds.

Ambient sounds (e.g., ambient noise) include human voices, vehicles noises, gun shots, loud music, highway noise, machinery, and other common natural and man-made sounds. Many CEW also include at least one small gap of air between handle 210 of the CEW 200 and cartridge 240 and/or 250 while is inserted into bay 230 of CEW 200. When CEW 200 provides a current, the air in these one or more small gaps of air is ionized so that the current may travel (e.g., flow) from the high voltage circuit in handle 210 to the cartridge 240 and/or 250 for delivery, if the circuit exits, through the target via the filaments and electrodes. The magnitude of the sound produced by ionizing these one or more small gaps is significantly (e.g., orders of magnitude, many times) less than the magnitude of the sound produced by an arc that ionizes across the face of the weapon between terminals 214 and 216 or terminals 224 and 226, or between the electrodes and the target when the electrodes are sufficiently proximate to target tissue for ionization to establish a circuit. However, the sound produced by ionizing the one or more small gaps contributes to the ambient noise and is a factor that obfuscates detecting and analyzing (e.g., assessing) the sound of ionization across larger gaps of air.

Any conventional method may be used to detect the sound of ionization whether across the face of the CEW or further in front of the CEW. In one implementation, the detector (e.g., microphone) and processing circuit cooperate to detect a peak magnitude (e.g., intensity) of sound.

Knowledge of the speed of propagation of sound may be used to detect the distance of an ionization in front of the CEW. Knowledge of the decrease in the magnitude of a sound as it travels through space may be used to detect the distance of an ionization in front of a CEW.

Sound travels through air at about 1,126 feet per second when the temperature of the air is 0 degrees Celsius and the atmospheric pressure of the air is 0.9869 atmospheres (e.g., standard temperature and pressure). The speed of sound changes most significantly with changes in air temperature. Over the operating range of a CEW, the speed of sound may change up to 20%. Table 1 below provides information as to the distance sound travels away from the source of the sound for different lengths (e.g., periods, durations, lapses) of time when the air is at standard temperature and pressure.

TABLE 1

| Duration of Time | Inches Travelled | Feet Travelled |
|---|---|---|
| 1 sec | 13,512 | 1126 |
| 100 millisecond | 1351 | 112.6 |
| 10 millisecond | 135.12 | 11.26 |
| 1 millisecond | 13.51 | 1.126 |
| 100 microsecond | 1.351 | 0.1126 |
| 10 microsecond | 0.1351 | 0.01126 |
| 1 microsecond | 0.01351 | 0.001126 |

In an example if an implementation, suppose that detector 220 is positioned about 2 inches rearward from the face (e.g., front) of handle 210. Further suppose that terminals 214 and 224 are position about 0.25 inches from the top of handle 210. A sound that originates proximate (e.g., near) to terminal 214 or 224 must travel at least 2.25 inches (0.1875 feet) to arrive at detector 220. The delay between producing the sound and the arrival of the sound at detector 220 is greater than 100 microseconds (e.g., about 166 microseconds). In an implementation, delays in operation of a processing circuit in addition to delays in the arrival of the sound at detector 220 results in a minimum delay between activating delivery of the current and detecting a sound of ionization, as measured by the processing circuit, of between about 170 microseconds to 300 microseconds.

Using the method of detecting the peak amplitude of a sound to detect the occurrence of ionization limits the maximum distances of detecting the sound of ionization to about 36 inches. Ionization of air in a gap is a point noise source. The amplitude of the peak of a point noise source diminishes as the inverse of the distance squared. So, the magnitude of the sound that is three (3) inches from the source of the sound is 100 times greater than the magnitude of the sound after it has travelled 30 inches away from the source.

In one implementation, detecting the noise of ionization compares the magnitude of the ambient noise before activating the CEW to the peak amplitude of the sounds that occur after activation. The occurrence of a sound that has an amplitude greater than the ambient noise is construed to be the sound of ionization. The magnitude of the sound of ionization at the face of the weapon is significantly greater that the magnitude of the ambient noise. The presence of other noise sources (e.g., ambient noise) and the sound from ionization of very small gaps between the handle and the cartridges, interferes with detecting peak amplitude for detecting ionization further away from the face of the CEW because the magnitude of a sound decreases rapidly as it travels from the source to the detectors. Even the relatively loud (e.g., intense) sound of ionization at a target may be overwhelmed by ambient noise before the sound can travel from the target to the detectors on the CEW.

For example, while using peak amplitude detection, if ionization occurs less than 36 inches away from the CEW, the magnitude of the sound of ionization likely will not decrease to a magnitude that is less than the magnitude of the ambient sounds before it reaches the detectors on the CEW. However, if ionization occurs at more than 36 inches away from the CEW, the magnitude of the sound of ionization likely will decrease to a magnitude that is less than the magnitude of the ambient noise by the time it reaches the CEW and will therefore be difficult if not impossible to detect.

Conventional signal processing techniques (e.g., fast Fourier transform, voice detection, signature detection) may be used to permit the detectors and the processing circuit to detect the sound of ionization at a distance that is much greater than 36 inches away from the CEW.

A known pulse repetition rate may assist the processing circuit in detecting the occurrence of ionization. When the CEW provides pulses at 22 pulses per second, the processing circuit knows that it may detect the sound of a pulse about every 45.5 milliseconds.

In an example that relates to CEW 200, suppose that the high voltage current provided by the CEW ionizes the air (e.g., arcs) between terminal 214 and 216. The sound that results from the ionization travels from the arc (e.g., terminal 214) to detector 220 in between 166 microseconds and possible 300 microseconds because of the proximity of terminals 214 and 224 to detector 220. Processing circuit 114 of CEW 200 may deduce, as a result of the short delay (e.g., lapse, expiration) of time between originating (e.g., initiating, causing) the delivery of the current (e.g., pulling trigger 262, operation by processing circuit 114) and the arrival of the sound of ionization that ionization occurred at the face of CEW 200.

In the event that ionization does not occur across terminals 214/216 or 224/226 at the face of CEW 200, the sound of ionization requires a longer time to arrive at detector 220. As discussed above, when using the peak amplitude method for detecting ionization, the maximum distance in front of CEW 200 that may be detected is about 36 inches, so the sound of the ionization reaches detector 220 about 2.66 milliseconds after originating delivery of the current.

Processing circuit 114 may use information regarding the delay of the sound of ionization after starting delivery of the current to determine a distance away from the face of CEW 200 that ionization occurred and/or a position at which the ionization occurred relative to CEW 200. Processing circuit 114 may use information regarding the magnitude of the detected sound and the likely initial magnitude of the sound to determine a distance travelled by the sound from its source to CEW 200. A short delay or a large magnitude likely indicates ionization across terminals 214/216 or 224/226, which likely means that the current was not delivered through the target.

Processing circuit 114 may record (e.g., store) in memory information regarding the magnitude and/or delay of arrival of each pulse of the current. Processing circuit 114 may further record information as to the detected (e.g., calculated) distance and/or position of ionization (e.g., one-dimension, two-dimensions, three-dimensions) with respect to CEW 200 for each pulse of the current.

In another example, assume that electrodes 244 and 248 are launched toward a target and couple to the target so that the electrodes may electrically couple by ionization to the target. In this example, assume that either or both electrodes 244 and 248 are separated from target tissue by a gap of air that may be ionized to electrically couple electrodes 244 and 248 to the target. Further assume CEW 200 is ten feet away from the target so filaments 242 and 246 extend at least ten feet from CEW 200 to the target. The sound that results from ionization of air in the gap between either electrode 244 or electrode 248 and target tissue would take about 8.8 milliseconds to travel from the target to detector 220 because of the distance between CEW 200 and the target. Because the delay between enabling the sound to be produced (e.g., pulling trigger 262) and detecting the sound at detector 220, CEW 200 may infer that no arc occurred between terminals 214, 216, 224, and/or 226, so it is likely that the electrodes are positioned in or near the target.

Processing circuit 114 may cooperate with detector 220 to determine the delay between enabling (e.g., initiating) delivery of a stimulus signal and the occurrence of the sound of ionizing air in a gap to determine the distance between CEW 200 and the location of ionization. Processing circuit 114 may cooperate with detector 220 to determine (e.g., measure) a magnitude of the sound of ionization to determine the distance between CEW 200 and the location of ionization.

A shorter delay or greater magnitude indicates that ionization occurred closer to CEW 200 and therefore the stimulus signal was likely not delivered through a target. A delay between 170 microseconds and about 300 microseconds indicates that the stimulus signal likely ionized air between terminals 214, 216, 224, and/or 226 rather than traversing filaments 242, 246, 252, and/or 256 to provide the stimulus signal through a target. Processing circuit 114 of CEW 200 may control current delivery and operation of detector 220 to determine the delay between enabling current delivery and detecting the magnitude/delay of the sound of ionization.

Figure 10:
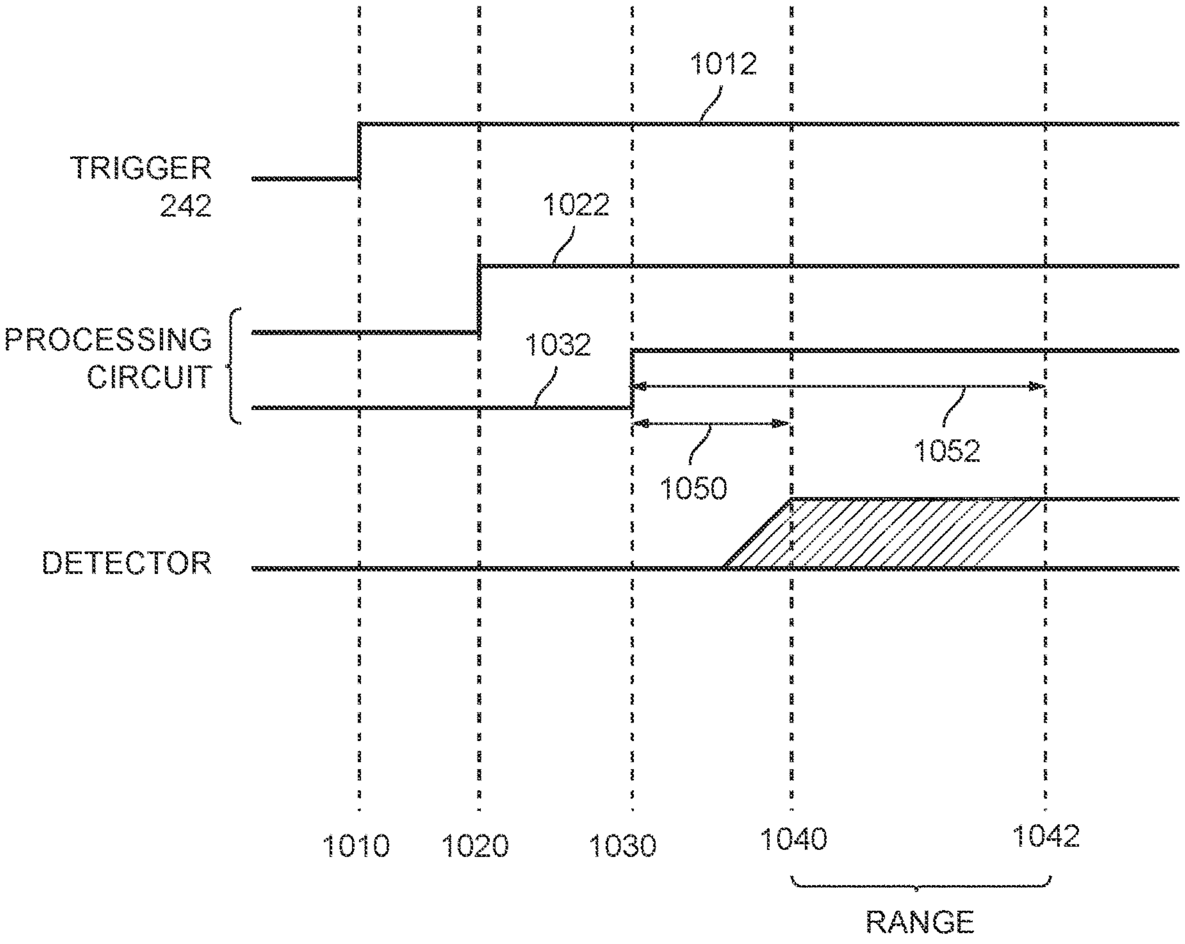
FIG. 10 is a plan timing diagram of operation of a detector of FIG. 1 according to various aspects of the present invention.

In an implementation, a user activates (e.g., pulls) trigger 262 to attempt delivery of a current through a target. Referring to FIG. 10, operating trigger 262 results in a change of state of signal 1012 from trigger 262 to processing circuit 114 of CEW 200 at time 1010. Responsive to detecting the operation of trigger 262, processing circuit 114 operates (e.g., controls) signal generator 118 of CEW 200 via a control signal, for example signal 1022, at time 1020 so that signal generator 118 receives energy from power supply 116 for the stimulus signal. The power from the power supply 116 charges one or more capacitances starting at time 1020. After signal generator 118 has received power for the stimulus signal, processing circuit 114 controls signal generator 118, for example via signal 1032, at time 1030 to deliver the stimulus signal. Processing circuit 114 may also at time 1030 enable detector 220 to detect sound (e.g., ambience, ionization), in particular the sound of ionization. In another implementation, detector 220 may operate without being enabled by processing circuit 114 (e.g., continuously). Detector 220 and/or processing circuit 114 may track time to determine the delay, for example delay 1050 or 1052, between the start of delivery of the stimulus signal at time 1030 and receipt of the sound of the occurrence of ionization sometime between time 1040 and 1042.

In one implementation, the processing circuit notes the time of initiating delivery of the current (e.g., 1030). Detector 220 provides a signal (e.g., notice) to the processing circuit that it has detected the sound of ionization (e.g., 1050, 1052). The processing circuit determines the difference in time (e.g., delay) between initiating delivery of the current and receipt of the notice from detector 220. The processing circuit compares the difference in time to a threshold time to determine whether ionization occurred across the terminals (e.g., 214, 216, 224, 226) of CEW 200 or whether ionization occurred forward of the terminals away from the face of CEW 200.

A short delay, such as delay 1050, of between 166 microseconds and 300 microseconds indicates that the sound of ionization likely occurred at a location proximate to the front of CEW 200. The short delay and the limited calculated distance indicate that the stimulus signal likely ionized between terminals 214, 216, 224, and/or 226 and was not delivered through the target.

A longer delay, such as delay 1052 indicates that the of ionization occurred at a location that is farther away from (e.g., forward of) CEW 200 and likely did not occur between terminals 214, 216, 224, and 226. A longer delay may indicate that ionization occurred proximate to the target such as to establish a circuit through the target to deliver the current through the target. When using the method of detecting a peak magnitude greater than the magnitude of ambience noise, the maximum delay is about 2.66 milliseconds which indicates ionization at most about 36 inches forward of the CEW. When using conventional, but more sophisticated techniques for detecting the sound of ionization, the maximum delay may be up to the length of filaments 242/246 and 252/256. In the case of a cartridge with 25 foot filaments, the sound of ionization at the target may take up to about 22 milliseconds to reach detector 220 at CEW 200.

A delay of 22 milliseconds may cause problems because at a pulse rate of about 44 pulses per second, ionization could occur at the target every 22.73 milliseconds which may not give processing circuit 114 sufficient time between pulses to detect and measure each pulse.

Detector 220 may further measure (e.g., detect) and provide information to processing circuit 114 regarding the magnitude of the sound of ionization so that processing circuit 114 may use known relationships between the decay of the magnitude of sound over distance and an estimated starting magnitude of the sound to detect a distance and/or position from CEW 200 to the location of ionization.

Detectors 148 and 158 detect a different physical property than detector 120 to detect delivery of a stimulus signal. In an implementation in FIG. 5, detectors 590, 592, 594, and 596 detect a flow of current through secondary windings 522, 532, 542, and 552 respectively. A current (e.g., stimulus signal) through a secondary winding of a transformer associated with a selected electrode indicates that a circuit exists for the current to travel, however, the current may flow via an ionization path between terminals (e.g., 214, 216, 224, 226) or via target tissue with or without ionization between the electrodes (e.g., 244, 248, 254, 258) and target tissue. If no current flows through the detectors coupled in series with the selected electrodes, then the stimulus circuit was not delivered through the target. Detecting current flow through detectors that are in series with electrodes that have not been selected to deliver the stimulus signal may be reported to the processing circuit as it may be an indication of a fault. The selection of electrodes to attempt electrical coupling to a target and delivery of a stimulus through the target are discussed below.

A processing circuit, such as processing circuit 114, may control detectors 590, 592, 594, and/or 596 so that the detectors are enabled prior to the time of attempting delivery of the stimulus signal so that the detectors may perform the function of detecting. Detectors 590, 592, 594, and/or 596 may report a result of detecting to the processing circuit. Any conventional signals and/or data transfer may be used by a processing circuit to control detectors 590, 592, 594, and/or 596. Any conventional signals and/or data transfer may be used for detectors 590, 592, 594, and/or 596 to provide information to a processing circuit. Whether a current was detected by detectors 590, 592, 594, and/or 596 may be reported to a processing circuit.

Detectors 590, 592, 594, and/or 596 may be omitted from an implementation and detection may be performed by alternate methods such as the methods performed by detector 220. Detector 220 may be omitted form an implementation and detection may be performed by detectors 590, 592, 594, and/or 596.

The delay between initiation of ionization (e.g., trigger pull) and detecting the sound of ionization may be further assessed with information regarding the discharge of capacitances (e.g., C511, C512, C513) to deduce the likelihood of delivery of the current through target tissue.

A processing circuit may record in a log the result of detecting so that the log includes information as to the detected physical properties and the likely outcome (e.g., delivered, not delivered, fault) of an attempt to deliver a stimulus signal through a target. As with conventional CEWs, the processing circuit may report any and all values recorded in a log to a central processing circuit (e.g., server) for storage, analysis, and reporting. CEW100/200 may report information from a log using any conventional communication link and communication protocol. A processing circuit may record and/or report the result of detecting the sound of ionization and/or the presence/absence of light for each pulse of current provided by the CEW.

One or more detectors that detect the same and/or different physical properties may cooperate to provide more information for determining whether a stimulus signal is delivered through target tissue. A processing circuit may control and/or coordinate the operation of the one or more detectors, receive information from the one or more detectors, and use the information received from the one or more detectors to make a determination as to whether a stimulus signal likely was delivered through target tissue. In an implementation, two detectors may provide information as to the direction from the face of the CEW to the location of ionization. In another implementation, three or more detectors may provide information as to a three-dimensional location of ionization from the face of the CEW.

In an implementation, processing circuit 114 may control detectors 220, 148, and/or 158, receive information from detectors 220, 148, and/or 158, record the information received from detectors 220, 148, and/or 158, make a determination as to whether a stimulus signal was delivered through target tissue, and report via any conventional electronic means the determination as to delivery of the stimulus signal.

In another implementation, CEW may include two detectors 220 with one positioned on top of handle 210, as shown in FIG. 2, and another one positioned on a bottom forward portion of handle 210. Handle 210 may further include a photo detector positioned to detect the light of an arc across terminals 214, 216, 224, and/or 226, but not an arc that occurs proximate to a target. Information from the various sensors, in combination with information from capacitances C511, C512, and/or C513 may be used to deduce the likelihood that current was delivered through target tissue.

Providing a current through a target via various pairs of electrodes may be beneficial to impeding locomotion of a target. As discussed above, locomotion may be impeded by causing apprehension or pain in a target or by causing the skeletal muscles of the target to become stiff as a result of (e.g., a reaction to) the current. The likelihood that a current will cause skeletal muscles to lock up increases if the spacing between the electrodes delivering the current is six or more inches apart. Increasing the distance the current travels through target tissues increases the likelihood that the skeletal muscles will stiffen responsive to the current thereby halting voluntary locomotion by the target.

Figure 6:
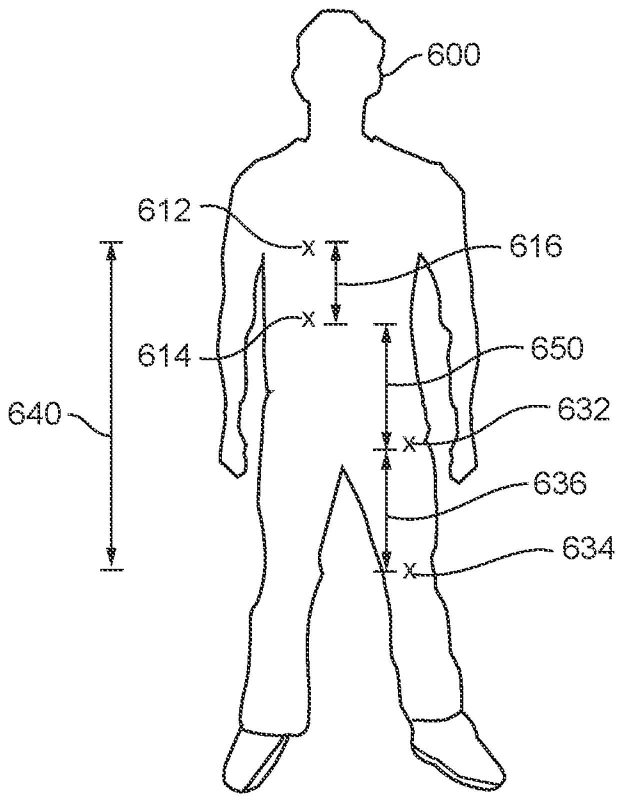
FIG. 6 is a plan view of electrodes of the CEW of FIG. 5 proximate to a target.

For example, the person (e.g., target 600) depicted in FIG. 6 is assumed to be about 6 feet tall. The locations (e.g., positions, spots) identified with the "X" on target 600 are locations where electrodes from a CEW have electrically coupled to target 600. Distance 616 between location 612 and location 614 appears to be less than 6 inches. Distance 636 between location 632 and location 634 appears to be more than 6 inches. Distance 650 between locations 614 and 632 and distance 640 between locations 612 and 634 are both much greater than 6 inches. As discussed above, greater distance between electrodes that deliver a current through target tissue improves the ability of the CEW to impede locomotion of the target. For impeding the locomotion of target 600, the preferred locations of the electrodes of an electrode pair, in order of preferences, are location 612/634, 614/632, 632/634 and 612/614. However, not all electrode pairs are available for providing a current and not all circuits are suitable for providing the current between various electrode pairs.

In conventional CEWs, electrodes are generally launched in pairs. Each pair is positioned in separate (e.g., different) deployment units. For example, electrodes that electrically couple to target 600 at locations 612 and 614 may be launched from one deployment unit (e.g., 240) while the electrodes that electrically couple to target 600 at locations 632 and 634 may be launched from another deployment unit (e.g., 250). The operations performed by the user of the CEW that launch electrodes from two separate deployment units are performed separately from each other and conventionally are performed sequentially. For example, a user of CEW 200 would launch electrodes that strike target 600 at locations 612 and 614 by operating trigger 262 of CEW 200. Upon determining that the electrodes at locations 612 and 614 do not effectively impeded the locomotion of target 600 or for added assurance that the locomotion of target 600 will be impeded, the user operates trigger 262 of CEW 200 again to launch another pair of electrodes that strike the target at locations 632 and 634. A CEW with more than two deployment units could launch even more pairs of electrodes toward the target.

However, launching the electrodes of different deployment units may not increase the likelihood of impeding target locomotion if the electrodes from different deployment units cannot cooperate with each other to deliver the current via a pair that includes one electrode from one deployment unit and another electrode from a different deployment unit. The signal generator of the CEW must be capable of providing the current via two, or possibly more, electrodes launched from different deployment units. The signal generator of a conventional CEW may not be capable of or well suited for providing the current through the target via electrodes launched from different deployment units.

For example, a conventional signal generator may include circuit 310 associated with one bay of a CEW and circuit 350 associated with another bay of the CEW. Separate deployment units may be inserted into each bay so that the electrodes of one deployment unit electrically couple to circuit 310 while the electrodes of the other deployment unit couple to circuit 350. Circuits 310 and 350 are the portions of a circuit of the signal generator used to deliver a current for ionizing air in a gap (e.g., electrically coupling) and for impeding locomotion of the target. The portions of the conventional signal generator that charge capacitances 311-313 and 351-353 are not shown.

Circuit 310 provides a current to electrodes 334 and 338 which are positioned in deployment unit 330. Circuit 350 provides a current to electrodes 374 and 378 which are positioned in deployment unit 370.

Circuit 310 includes capacitance C311, capacitance C312, capacitance C313, transformer T320, spark gap SG311, spark gap SG312, and spark gap SG313. Transformer T320 includes primary winding 322, secondary winding 324, and secondary winding 326. Deployment unit 330 includes, among other components, filament 332, filament 336, electrode 334, and electrode 338. Filament 332 electrically couples electrode 334 to secondary 324. Filament 336 electrically couples electrode 338 to secondary 326.

Circuit 350 includes capacitance C351, capacitance C352, capacitance C353, transformer T340, spark gap SG351, spark gap SG352, and spark gap SG353. Transformer T340 includes primary winding 342, secondary winding 344, and secondary winding 346. Deployment unit 370 includes, among other components, filament 372, filament 376, electrode 374, and electrode 378. Filament 372 electrically couples electrode 374 to secondary 344. Filament 376 electrically couples electrode 378 to secondary 346.

Circuit 310, or similarly circuit 350, operates as follows. To provide a pulse of the current (e.g., stimulus signal), a charging circuit (not shown) charges capacitance C311 with a positive voltage relative to ground, capacitance C312 with a positive voltage relative to ground, and capacitance C313 with a negative voltage relative to ground. The voltage across capacitance C312 and C313 is not sufficient to ionize spark gaps SG 312 and SG 313 respectively. Capacitance C311 is charged until the voltage across capacitance C311 is high enough to ionize spark gap SG311. When spark gap SG311 ionizes, the charge from capacitance C311 flows through primary 322. The current through primary 322 causes a high voltage to form across secondary windings 324 and 326. The high voltage applied by secondary winding 324 on filament 332 and electrode 334 is negative (e.g., −25,000 volts) relative to ground. The high voltage applied by secondary winding 326 on electrode 338 is positive (e.g., +25,000 volts) with respect to ground. Accordingly, the polarity of the voltage on electrode 334 is negative, while the polarity of the voltage on electrode 338 is positive. The voltage potential of the high voltage across (e.g., between) electrodes 334 and 338 is about 50,000 volts which is sufficient to ionize air in gaps between electrodes 334 and 338 and a target as discussed above. The high voltage across electrodes 334 and 338 is also sufficient to ionize air in spark gaps SG312 and SG313 so that when the high voltage establishes an electrical circuit with a target via electrodes 334 and 338, the charge from capacitances C312 and C313 discharges through the target.

As capacitance C311 discharges, the voltage it applies across primary winding 322 decreases. As the voltage across primary winding 322 decreases, the voltage across secondary windings 324 and 326 also decreases. However, a current continues to flow in the same direction in the secondary windings 324 and 326 as a result of the discharge of capacitance C312, which has a positive polarity, and capacitance C313, which has a negative polarity. Coupling capacitances C312 and C313 results in a reversal of the polarity of the voltage between electrodes 334 and 338. Thus, the voltage across (e.g., between) electrode 334 and 338, and the accompanying current, is provided in two phases (e.g., stages, intervals, parts). The first phase occurs while capacitance C311 discharges into primary winding 322 is referred to as the arc phase, and typically lasts about 2 microseconds. During the arc phase, electrode 334 has a negative potential and electrode 338 has a positive potential. The second phase occurs after capacitance C311 has substantially discharged and capacitances C312 and C313 begin to discharge. The second phase is referred to as the muscle phase. During the muscle phase, the polarity of electrode 334 is positive and the polarity of electrode 338 is negative. The current provided by capacitances C312 and C313 may travel across an ionization path established during the arc phase into target tissue (e.g., skeletal muscles) to interfere with locomotion of the target.

Circuit 310 repeatedly produces a pulse of current as discussed above to provide a series of pulses for impeding locomotion of the target. Circuit 350 works similarly to circuit 310.

However, even if the electrodes of deployment units 330 and 370 are deployed simultaneously into the same target (e.g., 400, 600), delivery of a current between electrodes pairs 334 and 378 or 338 and 374 may occur only as a matter of circumstances and may not occur at all. Current is unlikely to travel between electrodes 334 and 374 or electrodes 338 and 378 because the polarity of the voltages applied to those electrode pairs is the same polarity, so little voltage potential exists between those electrode pairs. The polarity of electrode 334 is different from the polarity of electrodes 338 and 378, so theoretically a current could travel between electrodes 334 and 338 or electrodes 334 and 378, but in reality the current is much more likely to travel between electrodes 334 and 338, which are electrodes launched from the same deployment unit, rather than between electrodes 334 and 378, which are electrodes launched from different deployment units.

For an example as to how a current may or may not be delivered between electrodes of different deployment units by a conventional signal generator circuit, assume that electrodes 334, 338, 374, and 378 are positioned on target 600 at locations 612, 614, 632, and 634 respectively. As discussed above, the current from capacitances C312, C313, C352, and C353 cannot be delivered through tissue of target 600 unless spark gaps SG312, SG313, SG352, and SG353 respectively are ionized. Ionizing spark gaps SG312, SG313, SG352, and SG353 occurs when a high voltage develops across the secondary windings of the respective transformers. So, a circuit through target 600 cannot be established via electrodes 334 and 378 or electrodes 338 and 374 unless capacitances C311 and C351 respectively are discharged through primary windings 322 and 342 respectively.

Discharging C311 through primary winding 322 causes a high voltage to develop across secondary windings 324 and 326. Assuming that electrodes 334 and 338 are separated from target 600 by respective gaps of air, the high voltage applied to electrode 334 enables electrode 334 to ionize air in the gap to electrically couple to target 600. However, the high voltage on secondary winding 326 also enables electrode 338 to ionize air in the gap to electrically couple to target 600. So, discharging capacitance C311 enables both electrode 334 and electrode 338, not just electrode 334, to establish an electrical coupling with target 600.

The same applies to circuit 350 and electrodes 374 and 378. Discharging C351 through primary winding 342 causes a high voltage to develop across secondary windings 344 and 346. Assuming that electrodes 374 and 378 are separated from target 600 by respective gaps of air, the high voltage applied to electrode 378 enables electrode 378 to ionize air in the gap to electrically couple to target 600. However, the high voltage on secondary winding 344 also enables electrode 374 to ionize air in the gap to electrically couple to target 600. As with capacitance C311, discharging capacitance C351 enables both electrode 378 and electrode 374, not just electrode 378, to establish an electrical coupling with target 600.

So, with conventional circuits 310 and 350, electrically coupling electrodes from different deployment units to a target results in electrically coupling both electrodes from each deployment unit to the target because when the conventional circuit applies a high voltage to one electrode of a deployment unit, it applies the high voltage to both electrodes of the deployment unit. A conventional circuit cannot apply the high voltage to just one electrode of a deployment unit. As a result, all electrodes from all launched deployment units receive a high voltage and are enabled to electrically couple to the target, and not just a selected pair of electrodes.

Once electrodes 334, 338, 374, and 378 are electrically coupled to target 600, the current from capacitances C312 and C313 will most likely flow between electrodes 334 and 338 because the discharge of capacitance C311 establishes a high initial discharge current from electrode 334 to electrode 338. So, even though it would be desirable to have the current flow through a circuit that included electrodes 334 and 378, the circuit between electrodes 334 and 338 will be established over and in preference to the circuit between electrodes 334 and 378. Some current may flow between electrode 334 and 378, but under similar electrode connections circumstances, the current flow between the electrodes of circuit 310 and 350 will always be less than the current between the electrodes of the same circuit.

The same applies to electrodes 338 and 374.

In some circumstances, a current may flow between electrodes of circuit 310 and the electrodes of circuit 350, which represents a current flow between electrodes of different deployment units. Assume that electrode 334 and electrode 378 are in close proximity to each other and either in or near target tissue. The discharge of capacitance C311 sets up a high voltage across secondary windings 324 and 326. The high voltage on electrode 334 may cause current flow to circuit ground via electrode 378, through transformer T340, and capacitance C353, since the circuit ground would be the same connection for circuits 310 and 350. Further, in some cases capacitances C312, C313, C352, and C353 may be shared between circuits 310 and 350. However, such operation depends on the circumstances of electrode placement relative to other electrodes, placement relative to a target, and flow of the current through the target. Establishing a flow of current between the electrodes of circuit 310 and circuit 350 cannot be controlled, established at will, or predicted.

In accordance with various aspects of the present invention, the present invention may deliver a current through target tissue via electrodes launched from different deployment units. The present invention may deliver current through a target via a pair of electrodes regardless of the proximity of other electrodes from the same or different deployment units. The present invention may select electrodes regardless of the deployment unit from which they were launched, establish an electrical coupling with the target for the selected electrodes to the exclusion of all other electrodes, and deliver a current through target tissue via the selected electrodes. The present invention controls the electrical coupling of the electrodes to the target to establish the circuit that delivers the current through target tissue. The present invention enables electrode selection for delivery of a current via a particular circuit regardless of the deployment unit that launched the selected electrodes and/or regardless of the relative position of the electrodes of the same or different deployment units.

For example, circuit 500 is a portion of a signal generator. Circuit 500 receives energy from a charging circuit (not shown) for providing a current through a target. Circuit 500 provides a current pulse. The current pulse may ionize air in one or more gaps, as discussed above, to establish an electrical coupling between circuit 500 and a target via electrodes and/or terminals.

As is discussed in further detail below, circuit 500 provides a pulse of current to impede target locomotion in two phases, an arc phase and a muscle phase, as discussed above. The voltage applied to electrodes used to deliver the pulse of current changes polarity between the first and second phases as discussed above.

Figure 3:
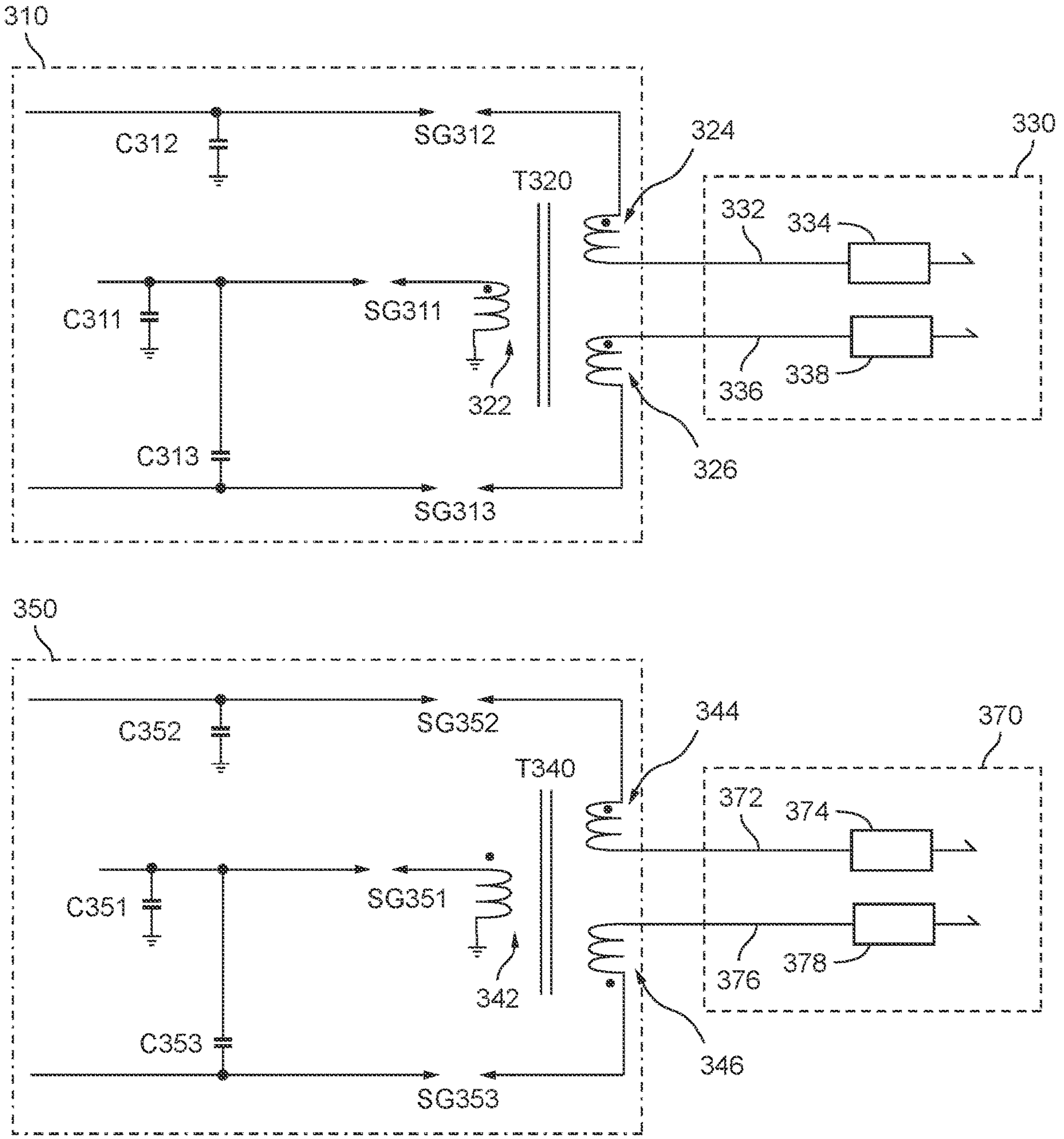
FIG. 3 is a schematic of a portion of a signal generator and deployment units of a conventional CEW.
Figure 5:
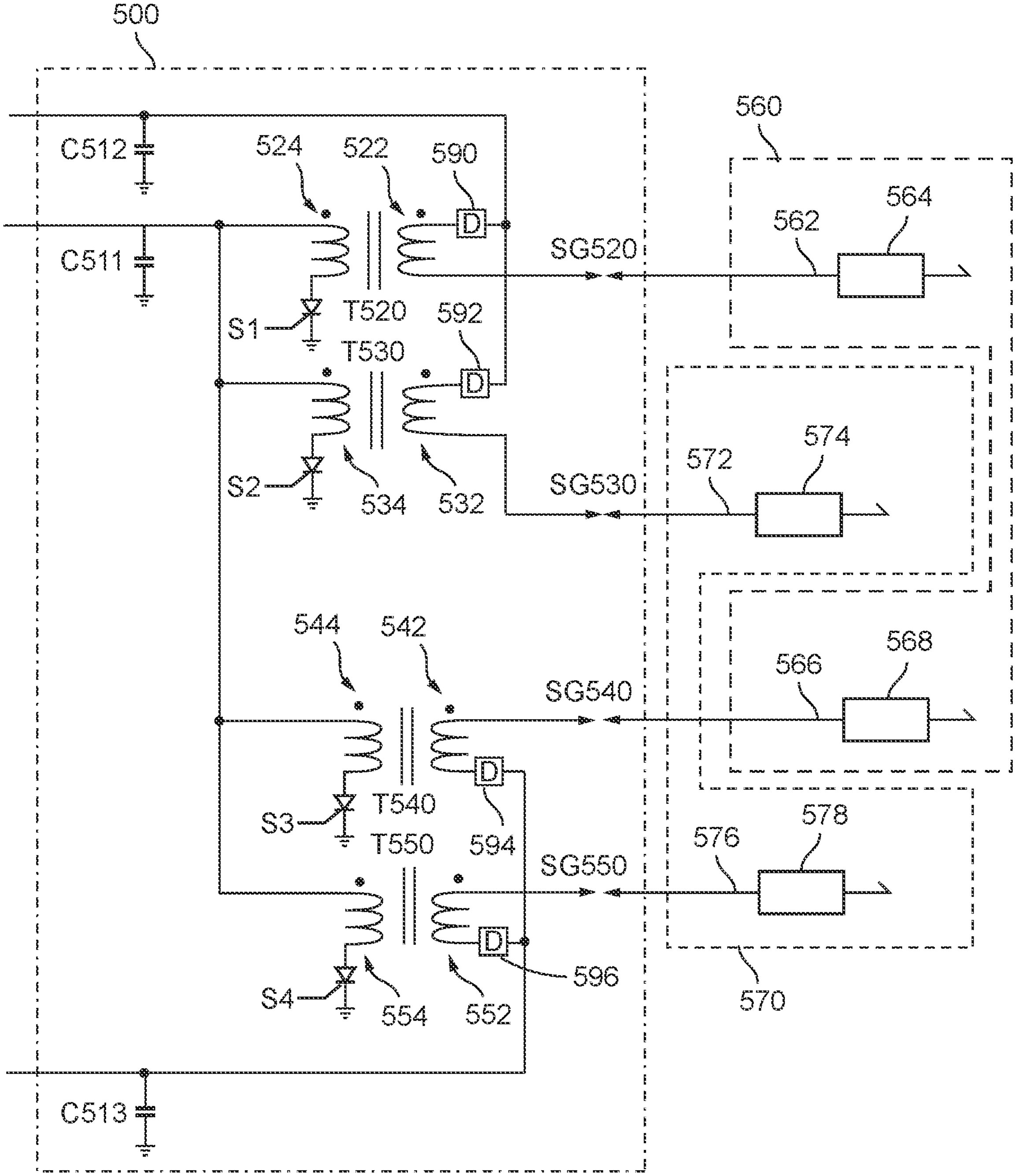
FIG. 5 is a schematic of a portion of a signal generator and deployment units of a CEW according to various aspects of the present invention.

As shown in FIG. 5, circuit 500 cooperates with filaments and electrodes of deployment unit 560 and deployment unit 570. The other components of each deployment unit 560 and 570, as discussed above, are not shown. Detectors 590, 592, 594, and 596 may be included in circuit 500 or may be omitted as discussed above. The filaments and electrodes of deployment units 560 and 570 are not shown adjacent to each other in FIG. 5, as in FIG. 3. Portions of circuit 500 cooperate with only one electrode.

For example, transformer T520, switch S520, and spark gap SG520 cooperate solely with filament 562 and electrode 564 of deployment unit 560. Transformer T540, switch S540, and spark gap SG540 cooperate solely with filament 566 and electrode 568 of deployment unit 560. Transformer T530, switch S530, and spark gap SG530 cooperate solely with filament 572 and electrode 574 of deployment unit 570. Transformer T550, switch S550, and spark gap SG550 cooperate solely with filament 576 and electrode 578 of deployment unit 570.

Each transformer includes a primary winding and a secondary winding respectively. Transformer T520 includes primary winding 524 and secondary winding 522. Transformer T530 includes primary winding 534 and secondary winding 532. Transformer T540 includes primary winding 544 and secondary winding 542. Transformer T550 includes primary winding 554 and secondary winding 552.

Primary windings 524, 534, 544, and 554 of transformers T520, T530, T540, and T550 are formed of a respective conductor (e.g., wire) that includes a first end and a second end. Secondary windings 522, 532, 542, and 552 of transformers T520, T530, T540, and T550 are formed of a respective conductor that includes a first end and a second end. Secondary windings 522, 532, 542, and 552 are not split windings as are secondary windings 324/326 and 344/346. A current the flows into the first end of secondary winding 522 flows out of the second end of secondary winding 522 and so forth with the other secondary windings. One end of each secondary winding couples to an electrode. The other end of each secondary winding couples to a capacitance.

The first end of the primary winding of each transformer is coupled in series with a respective switch. Primary windings 524, 534, 544, and 554 are coupled in series with switches S520, S530, S540, and S550 respectively. The switch controls the flow of current through the primary winding. The second end of the primary winding of each transformer is coupled to a capacitance (e.g., C511).

Switches S520, S5530, S5540, and S550 include any conventional switches that are suitable for the magnitude of current and voltage associated with operation of circuit 500. Switches S520, S530, S540, and S550 include any conventional switches that may be controlled (e.g., operated) by a processing circuit. Switches S520, S530, S540, and S550 are suitable for control by a signal (e.g., current, voltage, S1, S2, S3, S4) from a processing circuit (e.g., processing circuit 114). Control by a switch includes starting (e.g., initiating) and/or stopping (e.g., interrupting) the flow of current through the switch. Controlling the flow of a current through switches S520, S530, S540, and S550, controls the flow of the current through primary windings 524, 534, 544, and 554 respectively. Accordingly, a processing circuit may control a flow of current through each primary winding of transformers T520, T530, T540 and/or T550. A processing circuit may enable the flow of a current through the primary winding of one or more transformers, but not other transformers. A processing circuit may control circuit 500 so that only one electrode is enabled to electrically couple with a target, a pair of electrodes are enabled to electrically couple to a target, or more.

In one implementation, switches S520, S530, S540, and S550 are silicon controlled rectifiers ("SCR") (e.g., thyristor). Processing circuit 114 includes output ports that respectively couple to gate S1, S2, S3, and S4 of SCRs S520, S530, S540, and S550 respectively. Processing circuit may apply a voltage on the gate of an SCR to start a flow of current through the SCR. Because an SCR permits the flow of current in only one direction, SCRs S520, S530, S540, and S550 are coupled to the primary winding of their respective primary windings so that current that flows from capacitance C511 as capacitance C511 discharges flows through the primary winding and the SCR that is enabled to ground.

Although each transformer cooperates with only one filament and one electrode, as discussed above, capacitances C512 and C513 cooperate with one filament and electrode of each deployment unit. Capacitance C511 is selected by a processing circuit to cooperate with electrodes of all deployment units.

A transformer may receive a current at one voltage and provide a current at another voltage. A transformer may receive a current at a lower voltage and provide a current at a higher voltage. Providing a current through the primary winding of a transformer may induce (e.g., generates, causes) a current to flow in the secondary.

For example, in circuit 500, providing a current through the primary winding of transformers T520, T530, T540 and/or T550 causes a current to flow in the secondary winding of the same transformer. In this application, the current provided to the primary winding of a transformer is provided at a lower voltage and the current provided by the secondary winding is provided at a higher voltage. The higher voltage is sufficient to ionize the spark gap (e.g., SG520, SG530, SG540, SG550) in series with the secondary winding so that the higher voltage from the secondary winding is impressed on the electrode coupled to the secondary winding.

A capacitance stores a charge. While a capacitance stores a charge, a voltage is impressed across the capacitance. The voltage across a capacitance may have a positive or negative polarity with respect to ground. A capacitance may discharge to provide a current.

For example, capacitance C511 and capacitance C512 are charged to a positive voltage (e.g., 500 volts to 6,000 volts) with respect to ground. Capacitance C513 is charged with a negative voltage (e.g., 500 volts to 6,000 volts) with respect to ground. The charge stored on capacitance C511 may discharge through the primary winding (e.g., 524, 534, 544, 554) of one or more transformers (e.g., T520, T530, T540, T550) whose switches (e.g., S1, S2, S3, S4) have been enabled by a processing circuit. Discharging capacitance C511 into the primary winding of a transformer starts the arc phase of a current pulse for that transformer and the electrode coupled to that transformer.

The current through the primary winding causes a high voltage to develop across the corresponding secondary winding. The high voltage across the secondary winding ionizes the spark gap (e.g., SG520, SG530, SG540, SG550) in series with the secondary winding. Ionizing the spark gap permits the high voltage to travel via the corresponding filament to an electrode where the high voltage may ionize air in a gap between the electrode and a target to electrically couple the electrode to the target. Ionizing the spark gap also electrically couples capacitance C512 and/or capacitance C513 to a corresponding filament and electrode. Coupling capacitance C512 and C513 to the secondary windings of a transformer starts the muscle phase of the current pulse for that transformer and the electrode coupled to that transformer. If the high voltage electrically coupled an electrode to a target by ionizing air in a gap between the electrode and the target, the current from capacitance C512 and/or capacitance C513 discharges through the target to impede locomotion of the target.

If an electrode is in contact with target tissue, the high voltage may not need to ionize air in a gap to electrically couple the electrode to the target. The high voltage across the secondary winding of the enabled transformer ionizes the spark gap in series with the secondary winding so that capacitance C512 and/or capacitance C513 may deliver their charge through the target.

In operation, circuit 500 forms a pulse of current that may be delivered by selected transformers, and in turn by selected electrodes, through target tissue to impede locomotion of the target. Circuit 500 may be operated repeatedly for a period of time to produce a series of current pulses at a pulse rate to form a stimulus signal to impede locomotion of a target as discussed above.

Prior to providing a pulse of current, transformers T520, T530, T540, and T550 are preferably in a quiescent state in which the current flow in the primary and secondary windings are negligible and the voltage across the secondary has subsided sufficiently for the ionization path through the spark gaps to collapse (e.g., terminate, cease).

To provide a pulse of current, a charging circuit (not shown) receives energy from a power supply, such as power supply 116, and charges capacitances C511 and C512 to a positive voltage and capacitance C513 to a negative voltage. Because capacitance C512 is charged to a positive voltage and also due to the electrical connections (e.g., refer to phase dots) of the secondary windings of transformers T520 and T530 to capacitance C512 and electrodes 564 and 574, the polarity of the voltage applied to electrodes 564 and 574 during the muscle phase will be positive. Because capacitance C513 is charged to a negative voltage and also due to the electrical connections of the secondary windings of transformers T540 and T550 to capacitance C513 and electrodes 568 and 578, the polarity of the voltage applied to electrodes 568 and 578 during the muscle phase will be negative.

Further, because the winding ratios of transformers T520, T530, T540, and T550 are the same, the magnitude of the voltage when applied to electrodes 564, 574, 568, and 578 during the arc phase will each be around 25,000 volts, with electrodes 564 and 574 having a negative voltage potential and electrodes 568 and 578 having a positive voltage potential. Because the voltage potential and voltage magnitude on electrodes 564 and 574 during the arc and muscle phases are the same, a processing circuit will not select transformers T520 and T530 to be energized at the same time because current likely will not flow between electrodes 564 and 574. Further, because the voltage potential and voltage magnitude on electrodes 568 and 578 during the arc and muscle phases are the same, a processing circuit will not select transformers T540 and T550 to be energized at the same time because current likely will not flow between electrodes 568 and 578.

Due to the opposite voltage polarities applied to the electrodes, during both arc and muscles phases as discussed above, a processing circuit may select transformer T520 and transformer T540 to attempt to electrically couple electrodes 564 and 568 to the target and to deliver a pulse of current through target tissue via electrode 564 and electrode 568; transformer T520 and transformer T550 to attempt coupling and delivery of a current pulse through target tissue via electrode 564 and electrode 578; transformer T530 and transformer T550 to attempt coupling and delivery of a current pulse through target tissue via electrode 574 and electrode 578; and/or transformer T530 and transformer T540 to attempt coupling and delivery of a current pulse through target tissue via electrode 574 and electrode 568.

Delivery of a current through target tissue may also be made by selecting one transformer whose secondary winding provides a positive voltage and one or more transformers whose secondary windings provide a negative voltage or one transformer that provides a negative voltage and one or more transformers that provide a positive voltage. However, when three or more transformers are selected, the path of the current through the target is not predictable and depends on the circumstances of electrode placement. For example, it is difficult to predict which two electrodes of the three enabled electrodes will carry the current through target tissue. When only two transformers, and hence two electrodes, are selected and electrically coupled to the target, the current must travel through the circuit established by the selected transformers and electrodes because no other electrodes are electrically coupled or enabled to provide a current.

A processing circuit selects a transformer, and in turn the electrode coupled to the secondary winding of the transformer, by enabling the switch coupled to the primary winding of the transformer. For example, the processing circuit selects transformers T520 and T540 by providing a signal to gates S1 and S3 respectively to turn switches S520 and S540 on.

As discussed above, turning a switch on establishes a circuit to ground so that the charge on capacitance C511 begins to flow from capacitance C511 through the primary windings of the selected transformers.

For example, if transformers T520 and T540 are selected, current from capacitance C511 flows through primary windings 524 and 544 of transformers T520 and T540. The current through primary windings 524 and 544 induces a current in and a voltage across secondary windings 522 and 542. In the case of transformer T520, the current through secondary 522 is provided at a high negative voltage (e.g., 25,000 volts) during the arc phase and transformer T540 provides a current at a high positive voltage (e.g., –25,000 volts) also during the arc phase. The high voltage on secondary winding 522 and secondary winding 542 causes spark gaps SG520 and SG540 respectively to ionize. Ionization of spark gaps SG520 and SG540 applies the respective high voltages on electrodes 564 and 568 respectively.

Applying a high voltage to electrodes 564 and 568 infers that deployment unit 560 has been activated to launch electrodes 564 and 568 toward a target. Assume that at this point, electrodes 574 and 578 have not been launched from deployment unit 570. The high voltage applied on electrodes 564 and 568 may ionize air in a gap between electrodes 564 and 568 and a target to electrically couple electrodes 564 and 568 to the target. Because the voltage difference between electrode 564 and 568 is about 50,000 volts, the voltage is high enough to ionize gaps that total about one inch between electrodes 564 and 568. An electrode may also electrically couple to a target by penetrating target tissue.

Once electrodes 564 and 568 are electrically coupled to the target, a circuit is formed through the target. The circuit formed through the target permits capacitances C512 and C513 to discharge through target tissue to accomplish the muscle phase of the current pulse. The discharge of capacitances C512 and C513 provides current through the target in addition to any current that passed through the circuit while establishing the circuit. Providing current from capacitances C512 and C513 further reverses the polarity of the voltages applied to electrodes 564 and 568 to establish the muscle phase of the current pulse. Any current provided through target tissue from the high voltage and/or the current provided by the discharging capacitances C512 and C513 interferes with locomotion of the target. The operation of circuit 500 with respect to electrodes 564 and 568 may be repeated to provide a series of pulses of current through the target via electrodes 564 and 568.

In this example so far, the user of the CEW that includes circuit 500 has launched electrodes 564 and 568 from deployment unit 560 to establish a circuit through target tissue to provide a stimulus signal through the target. The user may elect to launch electrodes from a second deployment unit (e.g., 570) toward the target. Assume that the user launches electrodes 574 and 578 from deployment unit 570 toward the target. Assume that electrodes 574 and 578 strike target 600 at location 632 and 634 respectively and electrodes 564 and 568 previously struck target 600 at locations 612 and 614 respectively.

Since electrodes 574 and 578 have been launched, circuit 500 may attempt to provide a stimulus signal through target 600 via electrodes 574 and 578. The operation for providing a current pulse through electrodes 574 and 578, including the arc and muscle phases, is similar to the operation discussed above with respect to providing a pulse via electrodes 564 and 568. A charging circuit (not shown) charges capacitances C511 and C512 to a positive voltage and capacitance C513 to a negative voltage. The processing circuit selects transformers T530 and T550, and thereby electrodes 574 and 578, by providing a signal to gates S2 and S4 to turn on switches S530 and S550. Turning on switches S530 and S550 allows the charge on capacitance C511 to flow as a current through primary windings 534 and 554.

Because transformers T520, T530, T540, and T550 are step-up transformers, the voltage applied across primary windings 534 and 554 induces a higher voltage across secondary windings 532 and 552 to accomplish the arc phase of providing a current pulse. Due to the configuration of transformer T530 (e.g., refer to phase dots, secondary winding circuit), the high voltage (e.g., volts) produced in secondary winding 532 during the arc phase is a negative voltage with respect to ground. Due to the configuration of Transformer T550, the high voltage produced in secondary winding 552 during the arc phase is a positive voltage with respect to ground.

The high voltage from secondary windings 532 and 552 ionize spark gaps SG530 and SG550 respectively so that the high voltage across secondary windings 532 and 552 are applied to electrodes 574 and 578 respectively. Because in this example, electrodes 574 and 578 are proximate to target tissue, the high voltage (e.g., 50,000 volts) between electrodes 574 and 578 ionizes any air between electrodes 574 and 578 and target 600 to electrically couple, via the ionization paths, electrodes 574 and 578 to target 600.

During the arc phase, capacitance C511 discharges in about 2 microseconds to induce the high voltage on the secondary winding of the selected transformers. After capacitance C511 has discharged, it can no longer provide a voltage across the primary winding of the selected transformers, so the voltage across the secondary windings of the selected transformers decreases. As the voltage across the secondary windings decreases, the arc phase ends and the muscle phase begins as capacitances C512 and C513 provided current through the selected transformers and through the target. At the start of the muscle phase, the polarity of the voltage on electrode 574 becomes positive and the polarity of the voltage on electrode 578 becomes negative.

Once electrodes 574 and 578 are electrically coupled to target 600, the charge from capacitance C512 and capacitance C513 discharge through the circuit established through target tissue to impede locomotion of the target. The above discussed operation of circuit 500 with respect to delivering a pulse of current via electrodes 574 and 578 may be repeated to provide a series of pulses. A series of pulses provided by circuit 500 may be provided for a period of time (e.g., 5 second) at a rate of pulses provided per second (e.g., 22 pps).

Note that when the processing circuit selected transformers T530 and T550 to couple to the target to deliver a pulse of current, the processing circuit did not select transformers T520 and T540. Because transformers T520 and T540 were not selected, a high voltage did not develop in secondary windings 522 and 542, spark gaps SG520 and SG540 were not ionized, and a high voltage was not applied to electrodes 564 and 568. Because a high voltage was not applied to electrodes 564 and 568, electrodes 564 and 568 could not electrically couple to target 600 or delivery any of the charge from capacitance C512 or capacitance C513 through the target. Electrodes that are coupled to unselected transformers cannot establish a circuit through the target. Electrodes coupled to unselected transformers cannot participate in the delivery of a stimulus signal through target tissue, so delivery of the current does not depend on the position of the electrodes with respect to each other or on other conditions.

Control over which electrodes electrically couple to the target provides control over which electrodes may deliver a current through the target. Electrodes coupled to unselected transformers cannot deliver a current or participate in delivery of a current, so current delivery and electrodes may be selected and controlled.

The non-operation of transformers that are not selected results in different and more controllable operation of circuit 500 as compared to conventional circuits 310 and 350. Transformers not selected do not electrically couple electrodes to the target thereby precluding a circuit through unselected transformers, unselected electrodes, and the target. A conventional circuit produces a high voltage across fixed (e.g., not selectable) pairs of all launched electrodes thereby electrically coupling all launched electrodes to the target by fixed pairs of electrodes. In a conventional circuit, the electrodes launched from the same deployment unit operate as a fixed pair. Because all launched electrodes of the conventional circuit electrically couple to the target, delivery of a current through electrodes that are not of the same deployment unit (e.g., not a fixed pair) depends on the circumstances of, inter alia, electrode placement and tissue impedance.

In the circuit according to various aspects of the present invention, the current path through target tissue is selected by selecting the transformers and hence the electrodes that are energized to electrically coupled to the target. Because the electrodes in series with unselected transformers cannot electrically couple to the target, the current path is determined primarily by selecting transformers and electrodes and less on the circumstances of the placement of the unselected electrodes or tissue impedance.

Transformer selection, and therefore electrode selection, operates in the circuit of the present invention to electrically couple some, but not other electrodes to a target because the transformers, and in particular the secondary windings of the transformers, are in series with a single electrode and operate independently of each other. For example, in conventional circuit 310, energizing transformer T320 causes a current to flow in secondary windings 324 and 326 which are in series with different electrodes. So, energizing one transformer makes it possible to electrically couple two electrodes to a target and those two electrodes can form a circuit through target tissue.

In circuit 500, according to various aspects of the present invention, energizing transformer T520 energizes secondary 522 only which is in series with electrode 564 only. Energizing one transformer of circuit 500 may electrically couple one electrode to a target, but not two electrodes as with the conventional circuit. As a result, because the transformers operate independently of each other and are in series with only one electrode, the resulting circuit through a target may be better controlled and/or selected.

After delivery of a stimulus signal (e.g., series of current pulses) through target 600 via electrodes 574 and 578, circuit 500 may deliver further stimulus signals through target 600; however, in this example, because the electrodes from deployment units 560 and 570 have been launched and are all proximate to target tissue, processing circuit may select one or more electrodes from deployment unit 560 and one or more electrodes from deployment unit 570 to deliver a further stimulus signal through target 600.

As discussed above, electrode selection depends in part on the polarity of the voltage applied to the electrode by the transformer initially then by capacitances C512 and C513. Because electrode 564 of deployment unit 560 and electrode 574 of deployment unit 570 both couple to a high voltage of negative polarity during the arc phase and a voltage with a positive polarity during the muscle phase, a flow of current between electrodes 564 and 574 is not likely even though the electrodes are electrically coupled to the target. The same applies to electrodes 568 and 578. Because electrodes 568 and 578 couple to a high voltage of a positive polarity during the arc phase and a voltage with a negative polarity in the muscle phase, a flow of current between electrodes 568 and 578 is not likely even though the electrodes are electrically coupled to the target. As a result, a processing circuit will not select electrodes 568/578 or electrodes 564/574 as a pair of electrodes for providing the current.

Instead, a processing circuit may select one of the following transformer, and thus electrode, pairs to provide the current: transformers T520 and T540 (electrodes 564 and 568), transformers T520 and T550 (electrodes 564 and 578), transformers T530 and T540 (electrodes 574 and 568), or transformers T530 and T550 (electrodes 574 and 578). In this on-going example, electrodes 564, 568, 574, and 578 are positioned on target 600 at locations 612, 614, 632, and 634 respectively. Selecting transformers T520 and T540 provides the current from circuit 500 through target tissue between locations 612 and 614 via electrodes 564 and 568 because electrodes 574 and 578 at locations 632 and 634 do not electrically couple to target 600.

Selecting transformers T520 and T550 provides the current from circuit 500 through target tissue between locations 612 and 634 via electrodes 564 and 578 because electrodes 574 and 568 at locations 632 and 614 do not electrically couple to target 600. Selecting transformers T530 and T540 provides the current from circuit 500 through target tissue between locations 632 and 614 via electrodes 574 and 568 because electrodes 564 and 578 at locations 612 and 634 do not electrically couple to target 600. Selecting transformers T530 and T550 provides the current from circuit 500 through target tissue between locations 632 and 634 via electrodes 574 and 578 because electrodes 564 and 568 at locations 612 and 614 do not electrically couple to target 600.

As discussed above, the length of the circuit through target tissue is related to the likelihood of impeding voluntary movement by the target. Because the electrodes of unselected transformers do not electrically couple to the target, the selected transformers and associated electrodes electrically couple to the target and provide the current along target tissue between the locations of the electrodes. Selected transformers T520 and T540, T530 and T550, T530 and T540, and T520 and T550 provide the current along distances 616, 636, 650, and 640 respectively. Because distances 650 and 640 are longer than the other distances, providing the current via electrode pairs 574/568 and 564/578, even though the electrodes of the pairs are launched from different deployment units, may result in a greater ability to impede or even halt locomotion of the target.

A processing circuit, such as processing circuit 114, may select a pair of transformers, and therefore electrodes, from the transformer/electrode pairs identified above responsive to detecting that the selected transformer pair likely provides a current through the target as detected by detectors 120, 148, and/or 158. A processing circuit may attempt to provide the current through each pair regardless of whether the current is actually delivered through target tissue or regardless of what is detected by detectors 120, 148, and/or 158. Transformer, and therefore electrode, selection is further discussed below.

The polarity of the high voltages does not limit transformer selection to pairs of transformers. One transformer that produces a high voltage in the arc phase of a positive polarity may be selected along with two or more transformers that produce a high voltage at a negative polarity during the arc phase or vice versa. For example, transformer T520 may be selected because it produces a high voltage with a negative polarity during the arc phase and voltage with a positive polarity during the muscle phase while at the same time transformers T540 and T550 may be selected because they produce a high voltage with a positive polarity during the arc phase and voltage with a negative polarity during the muscle phase. When transformers T520, T540, and T550 are selected, the current provided by circuit 500 may be delivered through target tissue between electrodes 564 and 568 or electrodes 564 and 578. As discussed above with respect to the conventional system, selecting three transformers so that three electrodes electrically couple to the target means that the path traveled by the current through target tissue depends at least in part on electrode placement of the electrodes relative to each other and/or the impedance of target tissue between the selected electrodes. Transformers T530, T540, and T550; or transformers T540, T520, and T530; or transformers T550, T520, and T530 may be selected at the same time to deliver the current as discussed above.

As discussed above, circuit 500 may be repeatedly operated to provide a series of current pulses to form a stimulus signal that is provided through target tissue. Delivery of a series of pulses via electrodes in series with selected transformers from one or more deployment units is shown in FIGS. 7-9.

Figure 7:
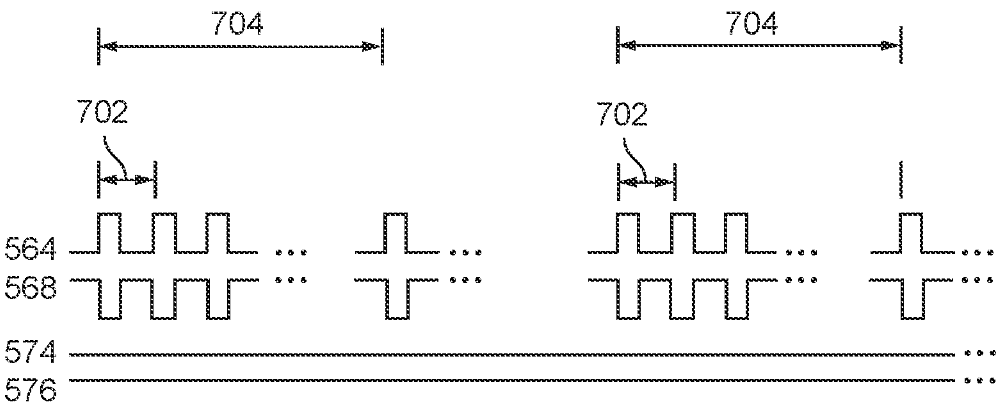
FIGS. 7 and 8 are diagrams of current pulses provided by a CEW according to various aspects of the current invention via electrodes launched from a single deployment unit.

The waveforms of FIG. 7 represent a situation when only electrodes 564 and 568 from deployment unit 560 have been launched and landed proximate to or in target tissue. Because only electrodes 564 and 568 have been launched, only electrodes 564 and 568 are available to electrically couple to the target to provide a current. Processing circuit selects transformers T520 and T540 for providing the current. Each operation of circuit 500 provides a single pulse of current.

Figure 8:
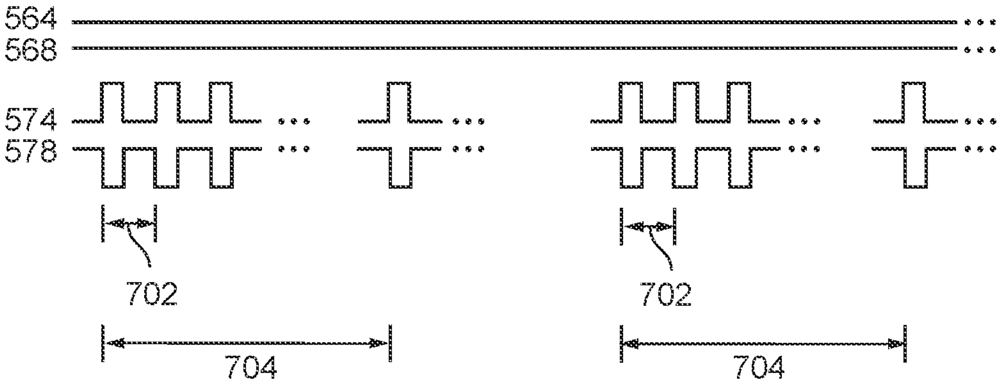
Figure 9:
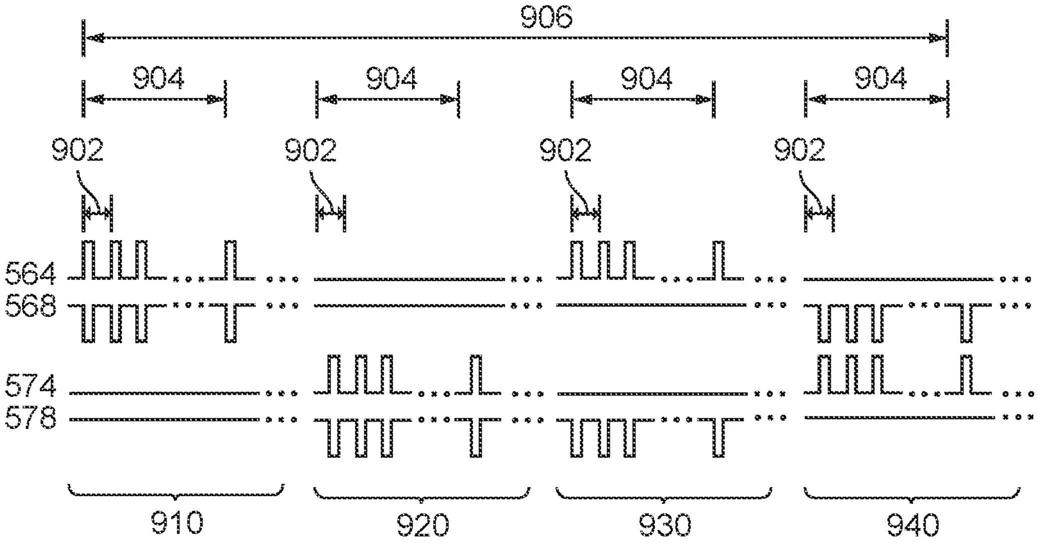
FIG. 9 is a diagram of current pulses provided by a CEW according to various aspects of the current invention via electrodes launched from two deployment units.

The current pulses show in FIGS. 7-9 do not identify the arc phase and muscle phase of a pulse as discussed above. For clarity of presentation, the pulses show in FIGS. 7-9 are show as having a single polarity (e.g., up, positive, down, negative) and do not include the polarity of the arc phase and the opposite polarity of the muscle phase. Each pulse of FIGS. 7-9 represent delivery of a single pulse of current that includes an arc phase and a muscle phase. A pulse of FIGS. 7-9 shown to have a positive polarity (e.g., up pulse) includes a voltage of negative polarity during the arc phase and a positive polarity during the muscle phase as discussed above with respect to transformers T520 and T530 and electrodes 564 and 574. A pulse of FIGS. 7-9 shown to have a negative polarity (e.g., down pulse) includes a voltage of positive polarity during the arc phase and a negative polarity during the muscle phase as discussed above with respect to transformers T540 and T550 and electrodes 568 and 578.

Circuit 500 is repeatedly operated to provide a series of pulses during duration of time 704. The duration of a series of pulses (e.g., stimulus signal, 704) is typically 5 seconds. The elapsed time between the start of each pulse, period 702, sets (e.g., determines) the number of pulses that can be delivered per second. For example, a pulse rate of 22 pps requires that a next pulse in a series of pulses start about 45.45 milliseconds after the start of the previous pulse. Further, at a pulse rate of 22 pps a CEW delivers about 110 pulses during a 5 second period, so in an implementation a stimulus signal includes about 110 pulses of current.

The duration of the delivery of current (e.g., charge) by a pulse does not last for the entire duration of period 702. After the processing circuit enables the switches of the selected transformers to send the charge from capacitance C511 in to the primary windings of the elected transformers, the resulting operations of developing a high voltage across the selected secondary windings, ionizing air between the selected electrodes and delivering the current from capacitances C512 and C513 takes about 25-60 microseconds. After the pulse is delivered all ionization paths collapse and circuit 500 waits in an uncharged state until the start of the next period for producing another pulse of current.

The time between the delivery of one series of pulses (e.g., stimulus signal) and a next stimulus signal may be any amount of time because providing a stimulus signal and subsequent stimulus signals is under the control of the user. Any amount of time may lapse between providing one stimulus signal during period 704 and a subsequent stimulus signal for an additional period 704 because each stimulus signal may be provided responsive to user operation of a trigger of the CEW.

The waveforms of FIG. 8 are analogous to the waveforms of FIG. 7 except only electrodes 574 and 578 have been launched from deployment unit 570 and electrically couple to a target, so electrodes 564 and 568 are not available to deliver current through the target. The pulse rate and duration of the series of pulses delivered by electrodes 574 and 578 are the same as the pulse rate and duration of the series of the pulses delivered by electrodes 564 and 568.

The waveforms of FIG. 9 show a method for providing a stimulus signal through a target when electrodes 564 and 568 have been launched from deployment unit 560 and electrodes 574 and 578 have been launched from deployment unit 570. A processing circuit, such as processing circuit 114, cooperates with circuit 500 so that circuit 500 attempts delivery of a series of current pulses via each possible pair of electrodes. During duration of time (e.g., period, period of time) 910, the processing circuit selects transformers T520 and T540, and thus electrodes 564 and 568, to attempt coupling and delivery of a series of pulses that form a stimulus signal. During duration 920, the processing circuit selects transformers T530 and T550, and thus electrodes 574 and 578 to attempt coupling and delivery of a series of pulses that form a stimulus signal that may be considered a continuation of the stimulus signal provided during period 910 or a different stimulus signal. During duration 930, the processing circuit selects transformers T520 and T550, and thus electrodes 564 and 578 to attempt coupling and delivery of a series of pulses as a stimulus signal. During duration 940, the processing circuit selects transformers T530 and T540, and thus electrodes 574 and 568 to attempt coupling and delivery of a series of pulses as a stimulus signal. The indicators 910-940 may also refer to the series of pulses that occur during the respective durations.

Duration 904 of each series of pulses 910, 920, 930, and 940 may be the same duration as the duration of a series of pulses when the electrodes of only one deployment unit have been launched (e.g., duration 704) or it may be different. If the duration of each series of pulses 910, 920, 930, and 940 is the same as duration 704, the total duration 906 of the stimulus signal would be at least four times greater than duration 704 when only two electrodes electrically couple to a target to deliver the stimulus signal. Providing a stimulus signal for a 5 second period from each electrode pair during each duration 910-940 enables a CEW to impede the locomotion of two different targets if the electrodes from deployment unit 560 coupled to one target and the electrodes from deployment unit 570 couple to a different target. In a situation where all electrodes of the CEW (e.g., 564, 568, 574, 578) are launched toward the same target, but only one electrode pair (e.g., 564/568, 564/578, 568/574, 574/578) electrically couples to the target the CEW will deliver a stimulus signal for a 5 second period during only one of the durations 910, 920, 930, or 940 to deliver via the pair that electrically couples to the target.

However, if all four electrodes are launched at the same target and electrically couple to the same target, the CEW will delivery four stimulus signals lasting for 5 seconds each via electrode pairs 564/568, 564/578, 568/574 and 574/578 respectively, which is 440 pulses assuming a pulse rate of 22 pps. Detecting the case when all four electrodes electrically couple to the same target and possible adjustments to the stimulus signal are discussed below.

In another implementation, the total duration of duration 906 is about the same as duration 704 (e.g., 5 seconds) as opposed to having each duration 904 be the same as duration 704. When duration 906 is the same as 704, assuming that the pulse rate is about 22 pps, each electrode pair provides a stimulus signal that includes about 28 or 29 pulses. Duration of period 902 may be the same as period 702 to provide about 22 pps or it may be different. In a situation where electrode pair 564/568 are in one target and electrode pair 574/578 are in a different target or where only one electrode pair electrically (e.g., 564/568, 564/578, 568/574, 574/578) couples to the target, providing only 28 or 29 pulses through a target as opposed to 110 pulses, as discuss with respect to FIGS. 7 and 8, may not provide sufficient current through the target to impede locomotion of the target. Because there is no assurance that when all electrodes are launched that all electrodes will electrically couple to the target, it is desirable to increase the pulse rate of the stimulus signal so that if only one pair of electrodes electrically couples to the target, the number of pulses provided through the target by that pair will be sufficient to impede locomotion of the target.

Consistent with the previous paragraph, in an implementation, circuit 500 operates to provide a stimulus signal during duration 906 (e.g., 5 seconds) at a pulse rate of 44 pps so that during each duration 910, 920, 930, and 940 respectively the CEW delivers 55 pulses to the target. If all electrodes electrically coupled to the target, the CEW delivers 220 pulses through the target during period 906. If only one pair of electrodes (e.g., 564/568, 564/578, 568/574, 574/578) electrically couples to the target, 55 pulses are delivered to the target during period 906. If two pair of electrodes (e.g., 564/568 and 564/578, 564/568 and 568/574, 574/578 and 568/574, 564/578 and 574/578) electrically couple to the target, 110 pulses are deliver to the target during period 906.

Pulses provided via the electrode pairs may also be interleaved. When pulses from electrode pairs are interleaved, one pair provides a single pulse, followed by one pulse from another pair of electrodes, and so forth repeatedly cycling through the electrode pairs at pulse rate 902 until total duration 906 expires. For example, electrodes 564 and 568 provide a single pulse, electrodes 574 and 578 provide a single pulse, electrodes 564 and 578 provide a single pulse, electrodes 574 and 568 provide a single pulse, then the sequence is repeated at pulse rate 902 until duration 906 expires.

As discussed in further detail below, a CEW may detect the number of electrode pairs available to deliver a current through the target so that the CEW may adjust the pulse rate of the stimulus signal in accordance with the number electrode pairs that can deliver a current through target tissue.

Figure 4:
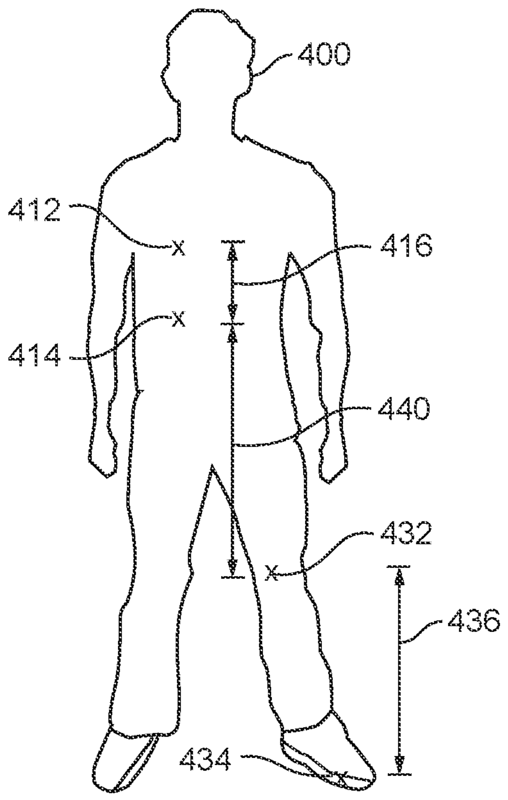
FIG. 4 is a plan view of electrodes of the CEW of FIG. 3 proximate to a target.

Transformers and thus electrodes may be selected by a processing circuit, such as processing circuit 114, to deliver a series of pulses without consideration as to whether the electrodes are positioned close enough to target tissue to establish an electrical coupling. Referring to FIG. 4, suppose that electrodes 564, 568, and 574 are in or within ionization distance of target tissue at locations 412, 414, and 432 respectively. Further suppose that electrode 578 is lodged at position 343 in sole of the shoe of target 400 and cannot electrically couple to target tissue. In such circumstances, circuit 500 cannot deliver pulses through target 400 via electrode pair 574/578 or electrode pair 564/578. If the processing circuit and circuit 500 provide current pulses without regard to electrically connectivity or ability to deliver, no pulses would be provided through target 400 during series 920 and 930 of FIG. 9. In an implementation that provides interleaved pulses, any pulse that should have been delivered electrode pairs 574/578 and 564/578 simply would not occur. The processing circuit would select the transformers for electrode pairs 574/578 and 564/578 and circuit 500 would attempt to couple and provide current pulses, but because a circuit cannot be formed via electrode 578, no pulse would be provided through target tissue whenever an electrode pair that includes electrode 578 is selected.

In another embodiment, a processing circuit may use information from detector 120, detector 148, and/or detector 158 to determine if one or more electrode pair combinations cannot establish a circuit. In the event that processing circuit receives information that current is not likely being delivered through a target by a particular pair, the processing circuit can omit to select that pair so that the current pulses may be delivered by electrode pairs that more likely can establish electrical connectivity with the target to deliver the stimulus signal.

For example, if the electrodes 564, 568, 574, and 578 are positioned at the locations on target 400 discussed above, detector 120 may visually detect an arc between the terminals 214, 224, 216, and/or 226 of CEW 200 each time electrode 578 is selected as one electrode of a pair to couple and deliver the current. Detecting the arc across the front of CEW 200 indicates, as discussed above, that a circuit has not been established through target tissue by the selected pair of electrodes, which in this example is any pair that includes electrode 578. The processing circuit may use the information from detector 120 to determine that electrode 578 cannot establish an electrical coupling to target 400. Using information from detector 120, the processing circuit can avoid selecting electrode pairs for which there is evidence that a circuit through the target likely cannot be established.

Detecting circuits through a target via the electrodes launched from a CEW may also be used to detect whether all of the electrodes launched from a CEW with multiple deployment units have electrically coupled to the same target. A CEW with multiple deployment units may engage one target or multiple targets. To engage one target, the electrodes from all deployment units may be launched to electrically couple to a single target. To engage multiple targets, the electrodes of one deployment unit are launched to electrically couple to one target and the electrodes of another deployment unit are launched to electrically couple to a different target.

Determining whether an CEW has engaged one or more targets may be important to determining an amount of force that should be delivered to a target or for adjusting delivery of a stimulus signal to the one or more targets so that the amount of force delivered to the one or more targets is sufficient to impede locomotion of the target yet less than any limits established by an agency for deploying a force from a CEW.

When electrodes launched from a CEW couple to target tissue, direct contact of the electrode, generally the spear of the electrode, with target tissue means that there is no gap of air between the electrode and the target that must be ionized to electrically couple the electrode to the target. Because the electrode may electrically couple to the target without ionization, a lower voltage, for example of between 500 and 20,000 volts as opposed to 50,000 volts, may be used to determine connectivity between electrodes via target tissue. In a situation in which the electrodes of two or more deployment units contact target tissue, applying a lower voltage between electrode pairs of the various deployment units may be used to determine connectivity between the electrodes and whether the electrodes of different deployment unit are coupled to the same or different targets.

For example, referring to FIG. 5, capacitance C512 and C513 may be charged so that the magnitude of the voltage between capacitance C512 and C513 is a lower voltage of between 500 and 20,000 volts. Capacitance C511 may also be charged. Switch S1 and S3 may be selected so that the voltage across capacitance C511 is applied to primary windings 524 and 544. Transformers T520 and T540 step up the voltage applied to primary windings 524 and 544 so that the voltage applied to spark gaps SG520 and SG540 is sufficient to ionize spark gaps SG520 and SG540.

Once spark gaps SG520 and SG540 are ionized, capacitances C512 and C513 are coupled to electrodes 564 and 568 and the voltage across capacitances C512 and C513 is applied across electrodes 564 and 568. Because in this example, electrodes 564 and 568 are embedded into target tissue, the voltage applied across electrodes 564 and 568 is applied to the target forming a circuit through target tissue. Capacitances C512 and C513 discharge through the circuit that includes target tissue and the voltage across capacitances C512 and C513 decreases. A processing circuit may detect the decrease in the voltage across capacitances C512 and C513 and/or a flow of current (e.g., charge) through the circuit to determine that electrodes 564 and 568 are electrically coupled to the target.

In another example, assume that electrodes 564 and 568 are positioned proximate to target tissue, but are not embedded into target tissue so that a gap of air is positioned between either or both electrodes 564 and 568 and target tissue. The gap of air will prevent the lower voltage from electrically coupling electrodes 564 and 568 to the target because the magnitude of the lower voltage is not sufficient to ionize the air in the gaps. If the test for connectivity between electrodes 564 and 568 at the lower voltage is negative (e.g., no connectivity, fails), then a test of connectivity may be performed at a higher voltage such as 50,000 or more volts so that the gaps of air are ionized to electrically couple the electrodes to the target.

In this circumstance, capacitance C511 is charged so that the voltage across secondary winding 522 and secondary winding 542 is about 50,000 volts when switch S1 and switch S3 are selected. The higher voltage ionizes the gaps of air between electrodes 564 and 568 and the target to electrically couple electrodes 564 and 568 to the target. Capacitances C512 and C513 may then discharge through the circuit formed through target tissue. The processing circuit may detect the decrease in the voltage across capacitances C512 and C513 and/or a current through the circuit to determine that electrodes 564 and 568 are electrically coupled to the target.

The lower and higher voltage connectivity tests discussed above may use a single or multiple pulses to test for connectivity.

If one electrode, such as electrodes 564 or 568, of an electrode pair, is not electrically coupled to the same target, whether by contact with target tissue or ionization across a gap, no circuit can be formed between electrodes 564 and 568. For example, if electrode 564 electrically couples to a first target and electrode 568 electrically couples to a second target that is separate (e.g., different) from the first target, no circuit can be formed between electrodes 564 and 568 using either the lower voltage or the higher voltage tests. When the higher voltage test for connectivity is performed, the high voltage applied to electrodes 564 and 568 cannot ionize air in gaps to establish a circuit because electrodes 564 and 568 are in or near different targets. Since a circuit cannot be formed through a target, the high voltage ionizes the air across the front (e.g., face) of the CEW to form a circuit. When the arc forms across the front of the CEW, a circuit is established that discharges capacitances C512 and C513, but in this case, because the high voltage arced across the front of the CEW, the discharge of capacitances C512 and C513 does not indicate that a circuit exits between electrodes 564 and 568.

The above processes (e.g., lower voltage, higher voltage) may be used to detect whether a circuit exits between electrode pairs 564/568, 564/578, 574/568, and 574/578. If a circuit exists between electrodes 564 and 578 then electrode 564, which was launched from deployment unit 560, and electrode 578, which was launched from deployment unit 570, are electrically coupled to the same target. If a circuit exists between electrodes 574 and 568 then electrode 574, which was launched from cartridge 570, and electrode 568, which was launched from cartridge 560, may electrically couple through tissue of the target. So, if circuit exits between electrodes 564 and 578 or electrodes 568 and 574, then the electrodes of two different cartridges are electrically coupled to the same target.

Detecting whether the electrodes of different deployment units are coupled to the same target is important due to the pulse rate considerations of a stimulus signal discussed above. As discussed above, when electrodes are launched from multiple deployment units, circuit 500 increases the number of pulses provided per second so that the CEW can impede the locomotion of two targets just in case the electrodes of one deployment unit were launched at one target and the electrodes of the second deployment unit were launched at a different target. Increasing the pulse rate of the stimulus signal upon launching electrodes from two or more cartridges increases the likelihood of providing a stimulus signal of sufficient force to impede locomotion of two targets. However, if all of the electrodes from the multipole cartridges are capable of providing a stimulus signal through the same target, the amount of force provided at the higher pulse rate may be more than is permitted under the use of force guidelines for the agency that issued the CEW. As a result, it is advantageous to be able to detect whether the electrodes of multiple cartridges electrically couple to the same target.

A CEW may detect whether a pair of electrodes can electrically couple to a target. A CEW may test each pair of the launched electrodes capable of delivering a current through a target to determine whether each pair can electrically couple to the target to deliver the current. A CEW may adjust (e.g., alter, change) a characteristics of a stimulus signal in accordance with the electrodes that may electrically couple to a target to deliver the current. A CEW may detect whether the electrodes of a pair of electrodes that electrically couple to a target were launched from the same or different cartridges. A CEW may record (e.g., note, remember, store) identifiers of the pairs capable of electrically coupling to a target. A CEW may deliver a stimulus signal via only those pairs of electrodes that electrically couple to the target. A CEW may frequently retest launched electrodes to determine whether an electrode pair may electrically couple to a target. A CEW may adjust delivery of the stimulus signal so that it is delivered via electrode pairs capable of electrically coupling to the target at the time. A CEW may detect electrode pairs that electrically couple to the same target. A CEW may detect electrode pairs that electrically couple to different targets. A CEW may detect whether the electrodes of one deployment unit couple to one target and the electrodes of another deployment unit couple to a different target. A CEW may detect whether the electrodes from different deployment unit couple to the same target.

Figure 11:
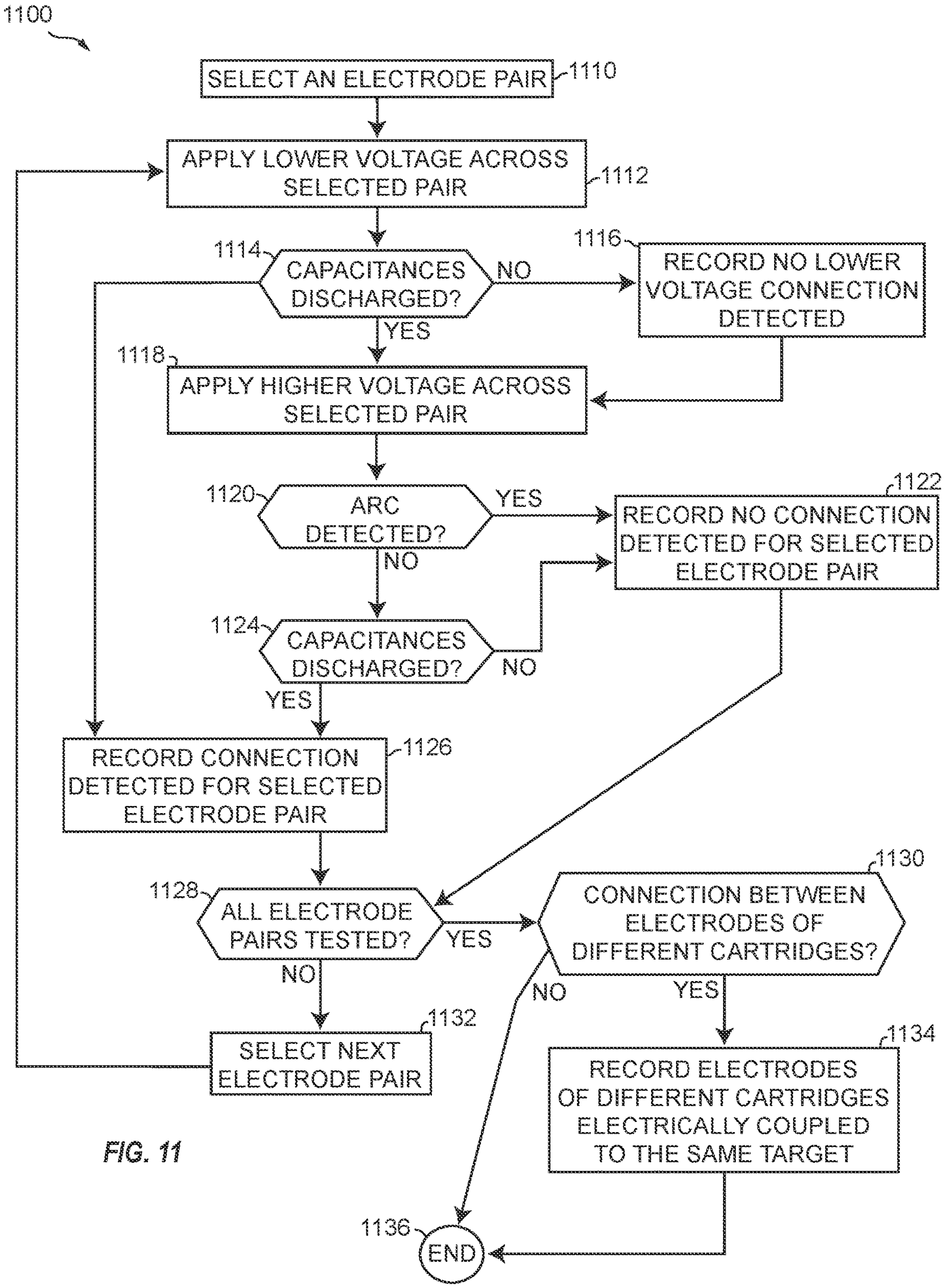
FIG. 11 is diagram of method for testing whether electrodes electrically couple to a target.

A CEW may perform the method 1100 of FIG. 11 to determine whether the electrodes of different cartridges are coupled to the same target. Method 1100 includes the following processes: select 1110, apply lower 1112, discharged 1114, record lower 1116, apply higher 1118, arc detected 1120, no connection 1122, discharged 1124, connection 1126, all tested 1128, select next 1132, different 1130, same 1134, and end 1136.

A processing circuit of a CEW may perform all or a part of method 1100. A processing circuit may cooperate with other components of a CEW to perform method 1100. A processing circuit may perform the processes of method 1100 in any conventional manner. A processing circuit may perform the processes in series, in parallel, some in series and others in parallel. A processing circuit may perform a process upon receiving information needed for the process or upon receipt of a control signal. A processing circuit may determine the present processing being executed and determine a next process for execution. A next process for execution may depend on a result of executing a present process.

Method 1100 detects whether launched electrodes may electrically couple to a target. Method 1100 detects whether electrodes that electrically couple were launched from different deployment units (e.g., cartridges). Method 1100 determines whether electrodes launched from different cartridges electrically couple to the same or a different target. A CEW possess (e.g., has, determines, deduces) information as to which electrodes are launched from the same or different cartridges.

Applying the lower and higher voltages discussed above may be used to detect (e.g., test) whether a pair of electrodes may electrically couple to a target. Method 1100 includes additional processes to detect the coupling of electrodes of different cartridges to the same target. All electrode pairs of circuit 500 that may deliver a current through a target include pairs 564/568, 564/578, 574/568, and 574/578. Each pair may be selected and tested to determine whether the electrodes of the pair may electrically couple to a target to provide the stimulus signal through the target. Process different 1130 may be used to determine whether electrodes pairs from different cartridges (e.g., 564/578, 574/568) may electrically couple to the same target.

Process select 1110 selects one pair of the electrodes from the launched electrodes. Any number of electrodes may have been launched. At least two electrodes are launched. The processing circuit has or may determine which electrode have been launched. A processing circuit may perform a process not shown in method 1100 for determining the electrodes that have been launched. Process select 1110 selects a pair of launched electrodes to determine whether the selected pair may electrically couple to a target to provide a current through the target. The polarity of the voltage applied on an electrode may be taken into account, as discussed above, when determining which two electrodes (e.g., pair) of the launched electrodes should be selected for testing.

Process apply 1112 applies the lower voltage to test for connectivity between the selected electrodes as discussed above. As discussed above, if a circuit may be formed using the selected electrodes at the lower voltage, the electrodes likely are in contact with target tissue.

Process discharged 1114 determines whether a charge has been provided through the target via the selected electrodes at the lower voltage. As discussed above, a processing circuit may detect a change in voltage across capacitances C512 and C513. A change in voltage across capacitances C512 and C513 indicate that a circuit was formed via the selected electrodes and charge from the capacitances were delivered via the circuit.

Process record lower 1116 makes a record that the connectivity test at the lower voltage did not establish an electrical circuit between the selected electrodes. A record may be made in any conventional manner by a processing circuit. A record may be made by recording a value in a memory or a register. The record may include an identifier for each electrode selected. The record may include a time stamp (e.g., date, date and time) for each test performed to create a historical record of testing and the result of testing.

In the event that a coupling is detected between the selected electrodes at the lower voltage, process connection 1126 is performed to make a record that a connection between the electrodes was detected. As discussed above, the record may be made in any conventional manner and may include electrode identifiers, and/or a time stamp.

In the event that no coupling is detected between the selected electrodes at the lower voltage, process apply higher 1118 is performed. Process apply higher 1118 applies a higher voltage, as discussed above, between the selected electrodes to ionize air in gaps between the selected electrodes and the target.

While process apply higher 1118 is executed, the processing circuit performs method 1120 to monitors the front of the CEW to determine whether an arc forms across the front of the CEW. When applying the higher voltage, the occurrence of an arc across the front of the CEW indicates that the selected electrodes could not form a circuit, so the high voltage stimulus signal ionizes air between two terminals on the face of the CEW. So, detecting an arc while applying the higher voltage indicates that a circuit could not be formed between the selected electrodes, so at least one electrode is not in or near the target.

An arc across the front of the CEW may be detected as discussed above using an audio detector. An arc may further be detected using a visual detector. Process arc detect 1120 may be performed by a processing circuit and/or detectors. Process arc detected 1120 may include operating the detector that detects whether an arc occurs at the front of the CEW as discussed above with respect to detectors 120 and 220. A processing circuit may receive information (e.g., a notice) from a detector as to whether or not an arc was detected.

If an arc is detected, process no connection 1122 is performed to make a record that connectivity between the selected electrodes was not established by applying the higher voltage. As discussed above, the record may be made in any conventional manner and may include electrode identifiers, and/or a time stamp. As discussed below, the record may further include information as to the result of process discharged 1124 that indicate that the capacitances were not discharged.

Not detecting an arc across the face of the CEW indicates that a circuit was formed through the selected electrodes. In the event that no arc is detected, process discharged 1124 is performed to determine whether a charge was provided via a circuit that includes the selected electrodes. If an arc is not detected and the capacitances in the signal generator (e.g., C512, C513) are not discharged, then the electrodes did not establish a circuit; however, in such conditions the high voltage should have arc across the front of the CEW. If the capacitances are still charged and no arc was detected, some anomaly has occurred that in method 1100 is construed as a circuit not being established so control passes to process no connection 1122. If no arc at the front of the CEW was detected and the capacitances are discharged, then a circuit formed between the selected electrodes and likely through a target. If process arc detected 1120 does not detect an arc and process discharged 1124 detects that the capacitances have been discharged, then control passes to process connection 1126.

Process connection 1126 makes a record that a circuit may be formed via the selected electrodes and likely through the target. It is conceivable that the selected electrodes may couple to each other (e.g., short out) away from the target, but because of how electrodes are launched, forming a circuit between the selected electrodes more likely indicates that the electrodes formed a circuit through target tissue. Further, the electrodes likely electrically couple to the same target. As discussed above, the record may be made in any conventional manner and may include electrode identifiers, and/or a time stamp.

After processes 1110 to 1126 inclusive have been performed, the processing circuit performs process all tested 1128 to determine whether all possible launched electrode pairs have been tested. A processing circuit may use any conventional method to track the pairs that should be tested (e.g., electrodes that have been launched), that have been tested, and that still need to be tested. A processing circuit may monitor and/or control the launch of additional electrodes (e.g., from additional cartridges) and modify the information used to track pairs the should be tested. A processing circuit may access stored records to determine whether the capability of a pair of electrodes has change since a previous test. A processing circuit, as discussed above, may use any conventional method for tracking and/or recording a result of testing for each electrode pair tested. In the event that process all tested 1128 determines that all electrode pairs have been tested, then control passes to process different 1130. In the event that process all tested 1128 determines that not all electrode pairs have been tested, control passes to process select next 1132.

Process select next 1132 selects a next pair of electrodes for testing. The next pair selected may be a pair that has not been tested. After the next electrode pair is selected, control passes to process apply lower 1112 for execution as discussed above.

Process different 1130 determines whether a circuit was formed between electrodes of different cartridges. Processes record lower 1116, no connection 1122, and connection 1126 create records as to whether a circuit was established between a particular pair of electrodes. A processing circuit further records, has access to information regarding, or determines which electrodes have been launched and the cartridge that held the electrodes prior to launch. A processing circuit may use such information to determine whether a circuit was formed between electrodes launched from different cartridges.

For example, referring to FIGS. 1 and 5, processing circuit 114 stores information that relates switches in series with primary windings of transformers, transformers, electrodes and cartridges. In an implementation, processing circuit 114 stores, receives, or has access to the information show in Table 1. The information in Table 1 relates the various components of circuit 500 to a specific cartridge. The information in Table 2 relates the possible electrode pairs of circuit 500 to the switches that are enabled by processing circuit to select the pair of electrodes and the cartridge that launches the electrodes of the pair. Because processing circuit 114 controls the selection of transformers and therefore electrodes via selecting a switch (e.g., S1, S2, S3, S4), processing circuit 114 may use the information of Tables 1 and 2 to determine whether the electrodes that electrically couple to a target were launched from the same cartridge or different cartridges.

TABLE 1

Cartridge Related Information

| Switch | Transformer | Electrode | Cartridge |
|---|---|---|---|
| S1 | T520 | 564 | 560 |
| S3 | T540 | 568 | 560 |
| S2 | T530 | 574 | 570 |
| S4 | T550 | 578 | 570 |

TABLE 2

Electrode Pair to Switch Related Information

| Pair | Switch Pair | Cartridges |
|---|---|---|
| 564/568 | S1/S3 | 560/560 |
| 564/578 | S1/S4 | 560/570 |
| 574/568 | S2/S3 | 570/560 |
| 574/578 | S2/S4 | 570/570 |

For example, if processing circuit 114 enables switches S1 and S3 and detects a circuit, processing circuit 114 may use the information from Tables 1 and/or 2 to determine that electrodes 564 and 568 may electrically couple to a target to provide a stimulus signal through the target and that electrodes 564 and 568 launched from cartridge 560, or in other words from the same cartridge. If processing circuit 114 enables switches S1 and S4 and detects a circuit, processing circuit 114 may use the information from Tables 1 and/or 2 to determine that electrodes 564 and 578 may electrically couple to a target to provide a stimulus signal through the target and that electrodes 564 and 578 launched from cartridge 560 and 570 respectively, or in other words from different cartridges.

If processing circuit 114 determines that a circuit exits between electrodes 564 and 578 or electrodes 568 and 574, then the processing circuit has determined that a circuit may be formed in the same target between electrodes launched from different cartridges. If a circuit exits only between electrodes 564 and 568 or electrodes 574 and 578, but not between electrodes 564 and 578 or electrodes 568 and 574, then only electrodes from the same cartridge are in the same target, which implies that the electrodes from cartridge 560 are in or near target tissue of one target while the electrodes of cartridge 570 are in or near target tissue of another, different target.

Process same 1134 makes a record that electrodes of different cartridges are in or near target tissue of the same target. As discussed above, the record may be made in any conventional manner. The record may include information that identifies the components of the circuit (e.g., circuit 500) that formed the circuit through the target, electrode identifiers (e.g., 564, 568, 574, 578), and/or cartridge identifiers (e.g., 560, 570).

Process end 1136 represents the end of performing method 1100.

A CEW, and in particular a processing circuit of a CEW, may perform an operation in accordance with determining that multiple electrode pairs and/or electrodes of different cartridges may electrically couple to and provide a stimulus signal through the same target. For example, responsive to detecting that two or more pairs of electrodes are in or near target tissue of the same target, the CEW may alter the stimulus signal provided through the multiple pairs of electrodes (e.g., reduce pulse rate). In another implementation, responsive to detecting that electrodes launched from different cartridges may provide a stimulus signal through the same target, the CEW may alter the stimulus signal provided through the target.

For example, the operation of circuit 500 was discussed above with respect to FIG. 9. In FIG. 9, stimulus signal 910 (e.g., series of pulses) is provided through target tissue via electrodes 564 and 568, followed by stimulus signal 920 via electrodes 574 and 578, followed by stimulus signal 930 via electrodes 564 and 578, followed by stimulus signal 940 via electrodes 568 and 574. Pulse rate 902 of stimulus signals 910, 920, 930 and 940 may be any value. In an implementation discussed above, pulse rate 902 is established to provide a pulse rate of 44 pulses per second. In a situation in which all electrodes of all cartridges deliver the stimulus signal through target tissue, a pulse rate of 44 pps may be more than is permitted under the use of force guidelines for a particular department or agency. So, information that all launched electrodes are in or near target tissue and are capable of delivering the stimulus signal through the target may be used to adjust the pulse rate so that the force delivered to the target falls within agency guidelines.

In the example of FIG. 9, all electrode pairs (e.g., 564/568, 564/578, 568/574, 574/578) deliver a stimulus signal through the same target at 44 pps. In such a situation, the current provided through the target may be more than a minimum required to impede movement by the target. If a CEW detects that the electrodes of one cartridge (e.g., 560) provide a current to one target and the electrodes of another cartridge (e.g., 570) provide a current to another target, the CEW may maintain the pulse rate at 44 pps during duration 906 so that both targets receive sufficient current to impede the movement of both targets. In another implementation, the CEW may increase the pulse rate to more than 44 pps to provide sufficient current through the two different targets to impede locomotion of the targets.

If a CEW detects that all electrode pairs can provide the stimulus signal through the same target, the CEW may decrease the number of pulses per second during duration 906 so that the amount of charge provided by the stimulus signal is closer to a desired amount required to impede movement by the target. In an implementation as shown in FIG. 9, when a CEW detects that it can deliver a stimulus signal to the same target via four pairs of electrodes (e.g., 564/568, 564/578, 568/574, 574/578), the CEW may reduce the pulse rate of the stimulus signals to between pps and 35 pps, preferably 22 pps.

If a CEW detects that it can deliver a stimulus signal via only two pairs of electrodes (e.g., 564/568, 564/578 or 564/568, 568/574 or 574/578, 568/574 or 564/578,574/578) through the same target, the CEW may set the pulse rate during duration 906 to between 30 and 100 pps, preferably 44 pps.

Adjusting the pulse rate based on the number of electrode pairs that can provide the stimulus signal through the same target during a duration 906 permits the CEW to adjust the amount of force (e.g., pulse rate) applied to the target so that it remains effective, yet does not use more force than permitted by an agency's guide lines for use of force.

The foregoing description discusses preferred embodiments of the present invention, which may be changed or modified without departing from the scope of the present invention as defined in the claims. Examples listed in parentheses may be used in the alternative or in any practical combination. As used in the specification and claims, the words 'comprising', 'including', and 'having' introduce an open ended statement of component structures and/or functions. In the specification and claims, the words 'a' and 'an' are used as indefinite articles meaning 'one or more'. When a descriptive phrase includes a series of nouns and/or adjectives, each successive word is intended to modify the entire combination of words preceding it. For example, a black dog house is intended to mean a house for a black dog. While for the sake of clarity of description, several specific embodiments of the invention have been described, the scope of the invention is intended to be measured by the claims as set forth below. In the claims, the term "provided" is used to definitively identify an object that not a claimed element of the invention but an object that performs the function of a workpiece that cooperates with the claimed invention. For example, in the claim "an apparatus for aiming a provided barrel, the apparatus comprising: a housing, the barrel positioned in the housing", the barrel is not a claimed element of the apparatus, but an object that cooperates with the "housing" of the "apparatus" by being positioned in the "housing".

What is claimed is:

1. A method comprising:

launching, by a conducted electrical weapon, at least three electrodes toward a target, wherein the at least three electrodes are configured to provide a stimulus signal to the target to impede locomotion of the target;

selecting, by the conducted electrical weapon, a first pair of electrodes from the at least three electrodes, wherein the first pair of electrodes from the at least three electrodes is capable of electrically coupling to the target;

providing, by the conducted electrical weapon, a first pulse of the stimulus signal through the first pair of electrodes;

selecting, by the conducted electrical weapon, a second pair of electrodes from the at least three electrodes, wherein the second pair of electrodes is different from the first pair of electrodes; and providing, by the conducted electrical weapon, a second pulse of the stimulus signal through the second pair of electrodes.

2. The method of claim 1, wherein the at least three electrodes comprises an at least one first electrode launched from a first deployment unit and an at least one second electrode launched from a second deployment unit.

3. The method of claim 1, further comprising interleaving, by the conducted electrical weapon, pulses of the stimulus signal between the first pair of electrodes and the second pair of electrodes.

4. The method of claim 1, further comprising:

selecting, by the conducted electrical weapon, a third pair of electrodes from the at least three electrodes; and providing, by the conducted electrical weapon, a third pulse of the stimulus signal through the third pair of electrodes.

5. The method of claim 4, wherein the third pair of electrodes is the same as the first pair of electrodes.

6. The method of claim 4, wherein the third pair of electrodes is different from the first pair of electrodes and the second pair of electrodes.

7. The method of claim 4, further comprising interleaving, by the conducted electrical weapon, pulses of the stimulus signal between the first pair of electrodes, the second pair of electrodes, and the third pair of electrodes.

8. The method of claim 4, further comprising interleaving, by the conducted electrical weapon, pulses of the stimulus signal between at least two of the first pair of electrodes, the second pair of electrodes, and the third pair of electrodes.

9. The method of claim 1, wherein at least one of the selecting the first pair of electrodes or the selecting the second pair of electrodes is based on a polarity of voltage applied to each electrode from the at least three electrodes.

10. The method of claim 1, wherein the first pulse of the stimulus signal is provided in a first phase and a second phase.

11. The method of claim 10, wherein a polarity of voltage applied to each electrode from the first pair of electrodes changes between the first phase and the second phase.

12. The method of claim 1, wherein the selecting the second pair of electrodes from the at least three electrodes comprises determining whether the second pair of electrodes from the at least three electrodes is capable of electrically coupling to the target.

13. A conducted electrical weapon comprising:

a processing circuit;

a signal generator configured to provide a stimulus signal; and at least three electrodes configured to provide the stimulus signal through a target to impede locomotion of the target, wherein after launch of the at least three electrodes toward the target, the processing circuit is configured to:

select a first pair of electrodes from the at least three electrodes, wherein the first pair of electrodes from the at least three electrodes is capable of electrically coupling to the target;

provide a first pulse of the stimulus signal through the first pair of electrodes;

select a second pair of electrodes from the at least three electrodes, wherein the second pair of electrodes is different from the first pair of electrodes; and provide a second pulse of the stimulus signal through the second pair of electrodes.

14. The conducted electrical weapon of claim 13, wherein the processing circuit is further configured to interleave pulses of the stimulus signal between the first pair of electrodes and the second pair of electrodes.

15. The conducted electrical weapon of claim 13, wherein the processing circuit is further configured to detect a number of pairs of the at least three electrodes available to deliver the stimulus signal through the target.

16. The conducted electrical weapon of claim 15, wherein at least one of the first pair of electrodes or the second pair of electrodes is determined based on the number of pairs available to deliver the stimulus signal through the target.

17. The conducted electrical weapon of claim 13, wherein the first pair of electrodes includes a first electrode and a second electrode, and wherein the second pair of electrodes includes the first electrode and a third electrode.

18. The conducted electrical weapon of claim 17, wherein a polarity of voltage applied to the first electrode changes between the first pulse of the stimulus signal and the second pulse of the stimulus signal.

19. A method comprising:

launching, by a conducted electrical weapon, at least three electrodes toward a target, wherein the at least three electrodes are configured to provide a stimulus signal to the target to impede locomotion of the target;

determining, by the conducted electrical weapon, at least two pairs of electrodes from the at least three electrodes capable of delivering the stimulus signal through the target; and providing, by the conducted electrical weapon, interleaved pulses of the stimulus signal through each pair of the at least two pairs of electrodes.

20. The method of claim 19, wherein the interleaved pulses of the stimulus signal are provided in a sequence through each pair of the at least two pairs of electrodes for a duration of time.

* * * * *